US010956997B2

(12) United States Patent
Kassim et al.

(10) Patent No.: US 10,956,997 B2
(45) Date of Patent: Mar. 23, 2021

(54) SYSTEM, METHOD, AND PROCESS FOR THE AUTOMATIC GENERATION OF DOCUMENTS

(71) Applicants: Yousef Kassim, Austin, TX (US); Nadi Kassim, Austin, TX (US); Rommy Kassim, Austin, TX (US)

(72) Inventors: Yousef Kassim, Austin, TX (US); Nadi Kassim, Austin, TX (US); Rommy Kassim, Austin, TX (US)

(73) Assignee: E-LEGAL, INC., San Antonio, TX (US)

( * ) Notice: Subject to any disclaimer, the term of this patent is extended or adjusted under 35 U.S.C. 154(b) by 0 days.

(21) Appl. No.: 14/511,697

(22) Filed: Oct. 10, 2014

(65) Prior Publication Data

US 2015/0212997 A1    Jul. 30, 2015

Related U.S. Application Data

(60) Provisional application No. 61/889,043, filed on Oct. 10, 2013.

(51) Int. Cl.
*G06F 17/24* (2006.01)
*G06F 17/21* (2006.01)
*G06Q 50/18* (2012.01)
*G06F 40/103* (2020.01)

(52) U.S. Cl.
CPC ........... *G06Q 50/18* (2013.01); *G06F 40/103* (2020.01)

(58) Field of Classification Search
CPC .... G06F 17/246; G06F 17/243; G06F 17/245; G06F 17/211; G06F 40/103; G06Q 50/18
See application file for complete search history.

(56) References Cited

U.S. PATENT DOCUMENTS

| 5,267,155 | A | 11/1993 | Buchanan et al. | |
|---|---|---|---|---|
| 5,664,109 | A * | 9/1997 | Johnson | G06F 19/322 705/2 |
| 5,692,206 | A | 11/1997 | Shirley et al. | |
| 5,987,480 | A | 11/1999 | Donohue et al. | |
| 8,176,412 | B2 | 5/2012 | Bhandar et al. | |
| 9,292,484 | B1 * | 3/2016 | Plow | G06F 17/243 |
| 2004/0128182 | A1 * | 7/2004 | Pepoon | G06Q 40/08 705/4 |
| 2005/0257134 | A1 * | 11/2005 | Goodman | G06F 17/243 715/226 |
| 2005/0273453 | A1 * | 12/2005 | Holloran | G06Q 10/10 |
| 2006/0178961 | A1 * | 8/2006 | Stanley | G06Q 40/02 705/31 |
| 2006/0271450 | A1 * | 11/2006 | Cohen | G06Q 10/10 705/30 |

(Continued)

*Primary Examiner* — Stephen S Hong
*Assistant Examiner* — Ahamed I Nazar
(74) *Attorney, Agent, or Firm* — William H. Quirk; Jesse L. Frizzell; Rosenthal Pauerstein Sandoloski Agather, LLP

(57) ABSTRACT

The present invention is in the field of data correlation and automatic document generation. Specifically the invention relates to a system that identifies and retrieves event information and personal information associated with a user, as well as agency information, including event-related agency information, to identify and automatically generate correlating documents, including documents like personalized legal petitions and contracts, that include agency information, event information, and/or personal information associated with a user.

5 Claims, 40 Drawing Sheets

(56) References Cited

U.S. PATENT DOCUMENTS

| | | | |
|---|---|---|---|
| 2007/0089049 A1* | 4/2007 | Gormish | G06F 17/24 715/224 |
| 2007/0282869 A1* | 12/2007 | Paulus | G06F 17/30893 |
| 2008/0052287 A1* | 2/2008 | Stanciu | G06F 17/2247 |
| 2008/0215976 A1* | 9/2008 | Bierner | G06Q 99/00 715/708 |
| 2009/0150442 A1* | 6/2009 | Barnard | G06Q 30/02 |
| 2009/0271359 A1* | 10/2009 | Bayliss | G06F 17/30303 706/54 |
| 2009/0271744 A1* | 10/2009 | Anders, Jr. | G06F 17/30899 715/855 |
| 2012/0166929 A1* | 6/2012 | Henderson | G06F 17/2785 715/224 |
| 2012/0284329 A1* | 11/2012 | van den Oord | G06F 17/276 709/203 |
| 2014/0096267 A1 | 4/2014 | Casso | |
| 2014/0136543 A1* | 5/2014 | Frieden | G06F 17/3097 707/741 |
| 2014/0172656 A1* | 6/2014 | Shaw | G06Q 40/123 705/31 |
| 2014/0173407 A1* | 6/2014 | Kruglick | G06F 17/276 715/226 |
| 2014/0279589 A1* | 9/2014 | Kennedy | G06O 50/18 705/311 |
| 2015/0212997 A1* | 7/2015 | Kassim | G06Q 50/18 715/226 |

\* cited by examiner

FIG. 1C
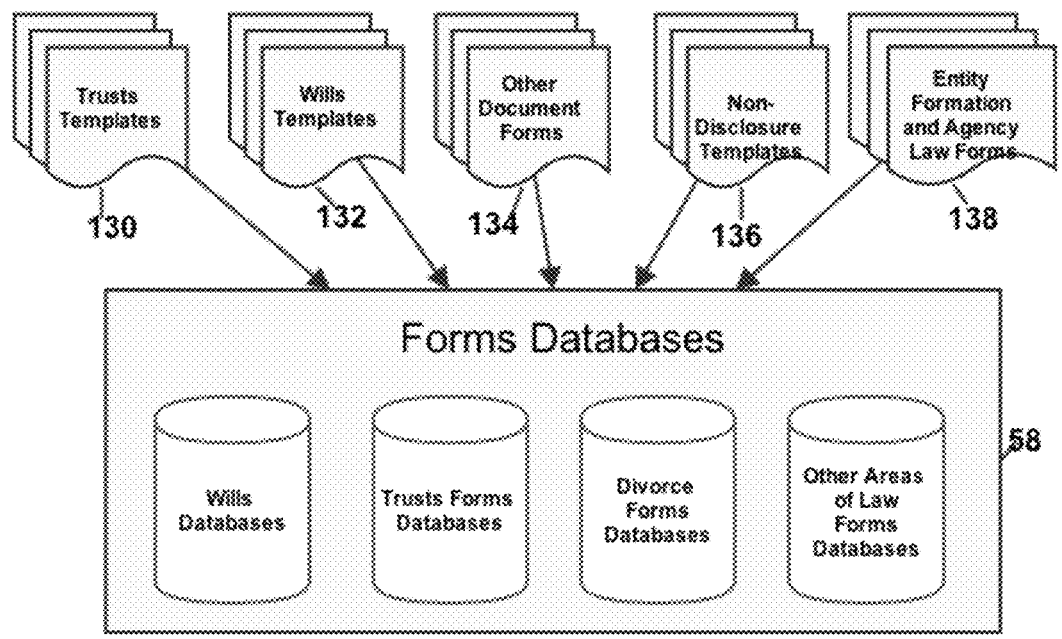
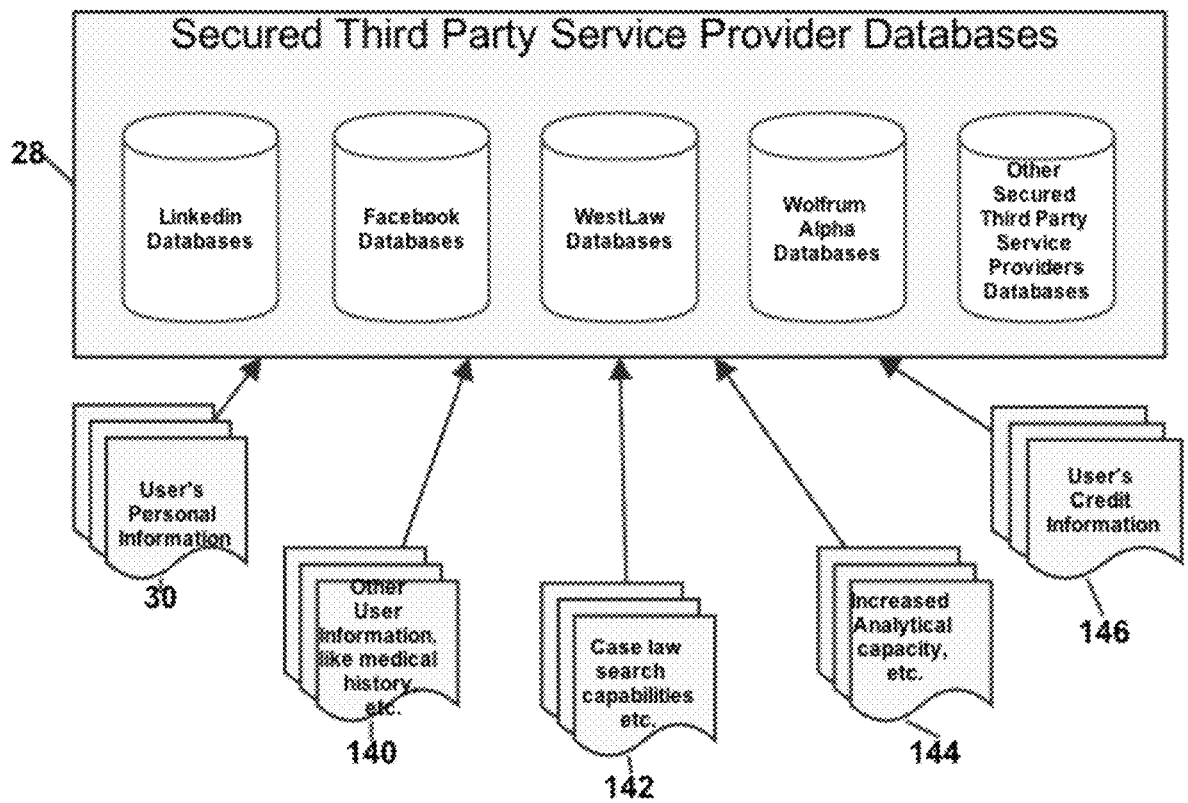

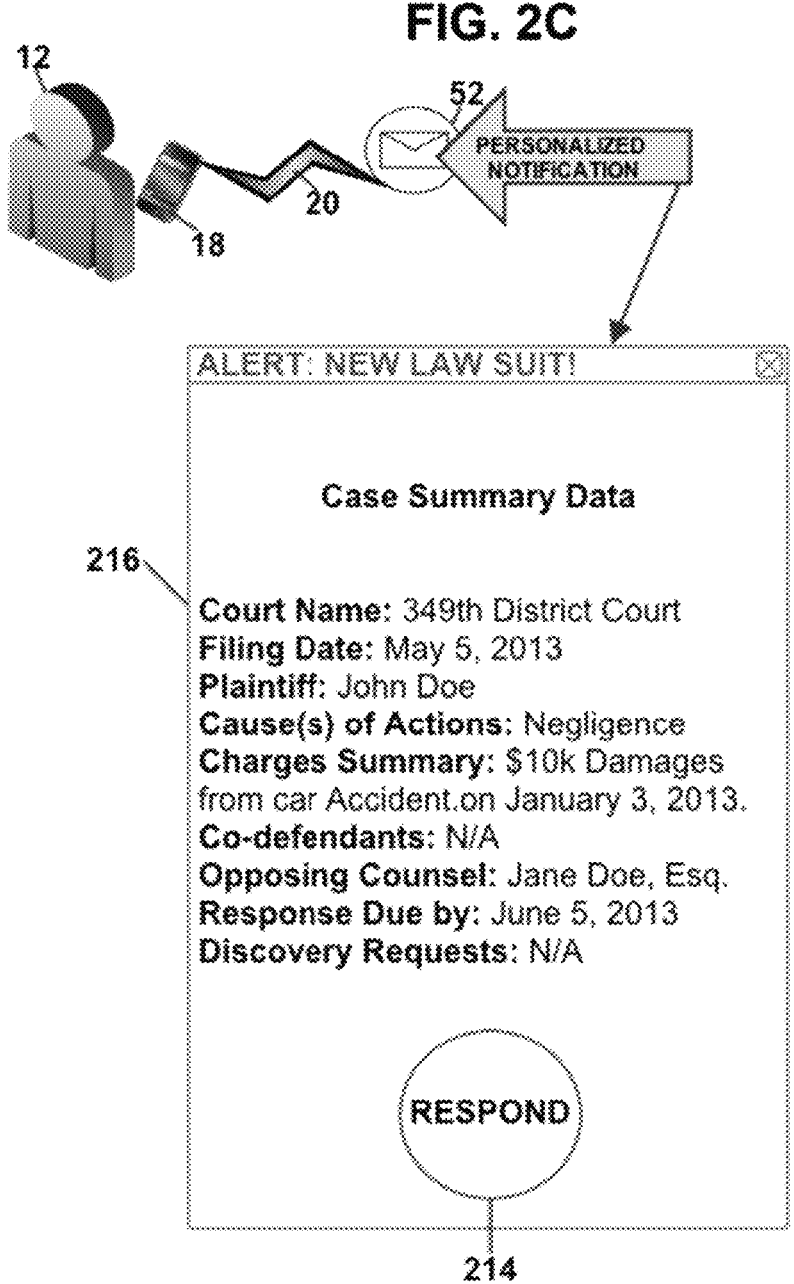

FIG. 3
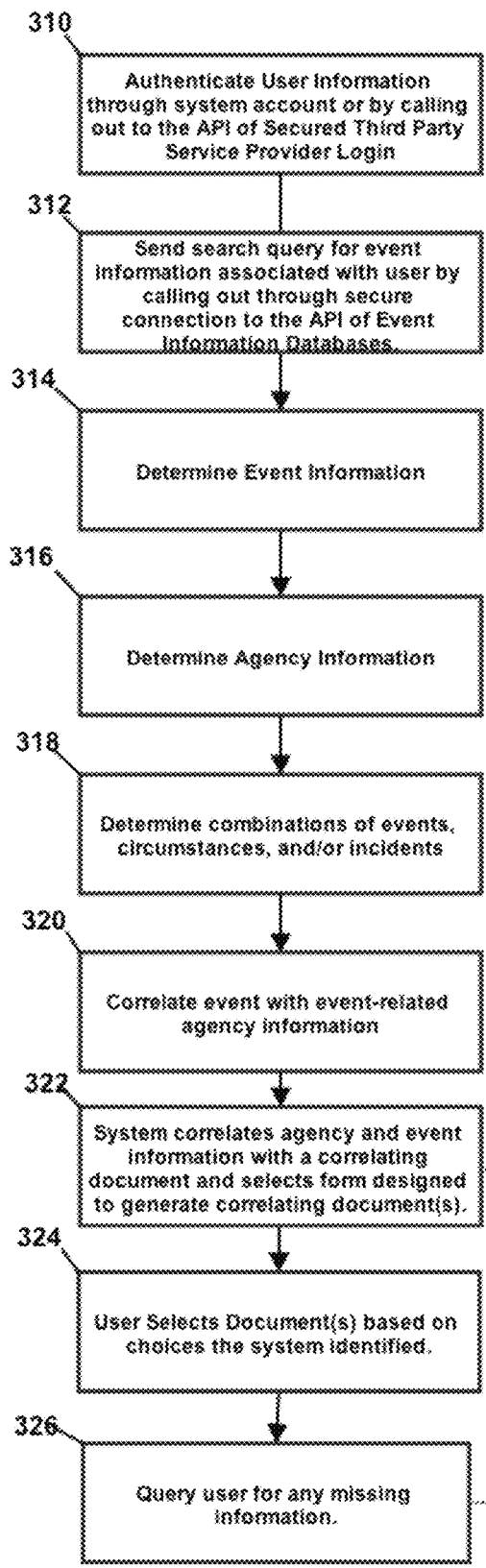
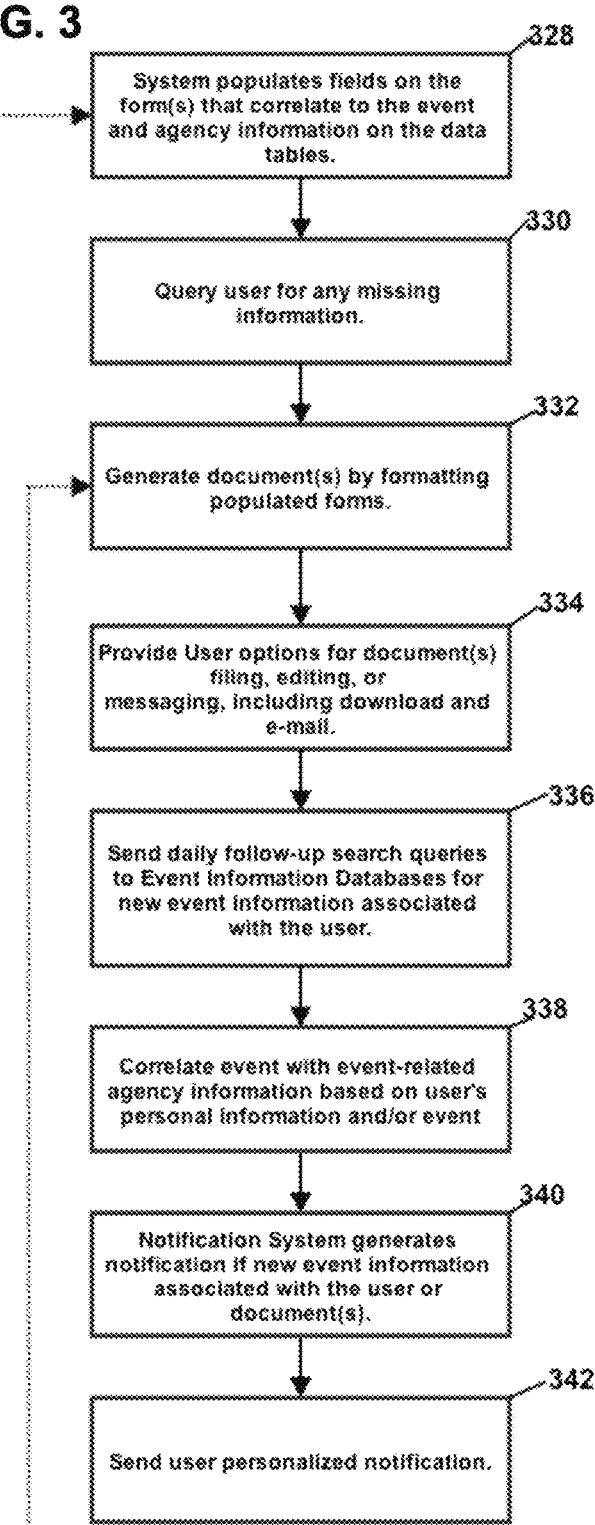

FIG. 5

Register of Actions
Case No. [____] — 512

The State of Texas vs [____] — 510

Case Type: Adult Misdemeanor - Filed by Information — 518
Date Filed: 04/22/2002
Location: County Court at Law
Other: [____]

116

PARTY INFORMATION

Defendant [____] — 522
Sugar Land, TX 77479

Male  White
5'3"  126 lbs — 516
514

Attorneys [____]

State  State of Texas

CHARGE INFORMATION

Charges [____]
1 ASSAU/CLASS C

Statute
22.01(A)(1)PC — 528

Level
Class C Misdemeanor

Date [____] — 524

Bonds
Surety Bond    APPROVED    $1,500
03/16/2002
Counts: 1
03/16/2002  Arrest Date

EVENTS & ORDERS OF THE COURT

DISPOSITIONS
10/26/2004 DISPOSITION (Judicial Officer Berstein, R. H. "Sandy")
1 ASSAULT/CLASS C
Convicted — 526
10/26/2004 FINE ONLY (Judicial Officer Berstein, R. H. "Sandy")
1 ASSAULT/CLASS C
OTHER EVENTS AND HEARINGS — 520

03/16/2002  Bond
04/22/2002  Commit/Release
04/22/2002  Hearing Remarks

04/26/2002  Arraignment/Out on Bond Hearing (9:00 AM) (Judicial Officer Berstein, R. H. "Sandy")
10/07/2003  Jury Trial (9:00 AM) (Judicial Officer Berstein, R. H. "Sandy")
10/26/2004  Conviction-Guilty Plea Nolo Contendere
10/26/2004  Plea/Disposition Hearing (9:00 AM) (Judicial Officer Berstein, R. H. "Sandy")

FINANCIAL HISTORY

| Event Information | Possible Values | Event Information Source | Meaning of Event Information |
|---|---|---|---|
| Current Date | MM/DD/YEAR | System Clock | Current Calender Date. |
| Arrest Date | MM/DD/YEAR or No Value | Event Information (Arrest Records and/or Case Disposition Records) | The Date the User was Arrested |
| Date Released | MM/DD/YEAR or No Value | Event Information (Arrest Records and/or Case Disposition Records) | Date that the User was released from custody after an arrest. |
| Case Status | Open, Closed, or Pending | Event Information (Arrest Records and/or Case Disposition Records) | The status of any criminal prosecution for charges filed against the User stemming from the Arrest, Indictment, and/or Information. |
| Charge Type | Misdemeanor or Felony | Event Information (Arrest Records and/or Case Disposition Records) | Weather the offense was a Misdemeanor or a Felony. |
| Misdemeanor Class | A, B, or C | Event Information (Arrest Records and/or Case Disposition Records) | Weather the Misdemeanor is a Class A, B or C. |
| Related Charge(s) | Value or No Value | Event Information (Arrest Records and/or Case Disposition Records) | Weather or not additional charges against the User exist as a result of the Event that gave rise to the original charge. |
| Case Disposition(s) | Conviction, Dismissal, Acquital, or Deferred Prosecution. | Case Disposition Records | The result of the criminal prosecution of the User for the arrest and/or criminal offence charge. |
| Case Disposition Date | MM/DD/YEAR or No Value | Case Disposition Records | The Date that any Criminal prosecution against the User concluded. |
| Felony Conviction Date | MM/DD/YEAR or No Value | Case Disposition Records | The most recent date the user has been convicted of a felony. |
| Statute of Limitations Expiration Date | MM/DD/YEAR or No Value | Event-related Agency Information | The date that the statute of Limitations expires to prosecute the User for the criminal offence the User was charged with. |

FIG. 6A

| a | b | c | d |
|---|---|---|---|
| Information Status | Active Or Dismissed | Event Information (Arrest Records and/or Case Disposition Records) | The status of any information that may have been issued against the User. |
| Indictment Status | Active or Dismissed | Event Information (Arrest Records and/or Case Disposition Records) | The status of any indictment that may have been issued against the User. |
| Indictment Issue Date(s) | MM/DD/YEAR or No Value | Event Information (Arrest Records and/or Case Disposition Records) | The status of any indictment that may have been issued against the User. |
| Information Issue Date(s) | MM/DD/YEAR or No Value | Event Information (Arrest Records and/or Case Disposition Records) | The status of any information that may have been issued against the User. |
| Court Ordered Community Supervision | Value or No Value | Case Disposition Records | Weather or not the User was issued any Court-ordered Community supervision (pursuant to Texas code of Criminal Procedure Article 42.12) as a result of the criminal charge(s)filed against User. |
| Reason for Dismissal | (1) Actual Innocence, (2) Pretrial Intervention, (3)Insufficent Evidence, (4) Motion of Court, (5) Presentment Made by Mistake, (6) Presentment Made by False Information, (7) Void Charge, (8) Similar reason showing no probable cause to believe the person committed the offense, and/or (9) Motion of Prosecutor. | Case Disposition Records | The reason that the criminal charge(s) filed against the User were dismissed. |
| Status of Deferred Prosecution | Revoked, In Progress, Incomplete, Complete | Case Disposition Records | The status of a Deferred Prosecution agreement entered into by the User, if applicable. |
| Failure to Appear Charge | Value or No Value | Event Information (Arrest Records and/or Case Disposition Records) | Weather or not the User was charged with a Failure to Appear in connection with the criminal charge(s) filed against the User. |
| Case Disposition for Failure to Appear Charge | Conviction, Dismissal, Acquital, or Deferred Prosecution. | Case Disposition Records | The result of the criminal prosecution of the User for a failure to Appear in connection with the criminal charge(s) filed against the User. |

FIG. 6B

| | | |
|---|---|---|
| Inmate Status | Value or No Value | Event Information (Database of current inmates in Texas prisons.) | Weather or not the User is currently listed as a registered inmate in a Texas prison. |
| Appeal File Date | MM/DD/YEAR or No Value | Case Disposition Records | The date that an appeal may have been filed by or against the User. |
| Appeal Case Status | Open, Closed, or Pending | Case Disposition Records | The status any appellate proceedings as associated the criminal charge(s) filed against the User. |
| Appeal Case Disposition | Conviction, Dismissal, Acquittal, or Deferred Prosecution. | Case Disposition Records | The result of the criminal prosecution of the User for a Failure to Appear in connection with the criminal charge(s) filed against the User. |
| Appeal Court Name | Court of Criminal Appeals or Name of Other Appellate Court | Case Disposition Records | The name of the Appellate Court that issued the most recent Appeal Case Disposition. The only Appeals Court whose acquittal will allow for an Expunction, unless the User also received an acquittal in the Trial Court, is the Court of Criminal Appeals. |
| UserPardoned for Offense | Value or No Value | Event Information (Database of Individuals who received a Pardon from the Governor for conviction). | Weather or not the User was pardoned for a conviction of criminal charge(s)against the User. |
| Co-defendants | Value or No Value | Event Information (Arrest Records and/or Case Disposition Records) | Weather or not criminal charge(s) were filed against other individuals in connection with the criminal charge(s) filed against the User or if public records information indicates that evidence asociated with the User's criminal charge(s) as evidence for current prosecution of the User or another individual. |
| Case Disposition of Co-defendants | Conviction, Dismissal, Acquittal, or Deferred Prosecution. | Case Disposition Records | The result of the criminal prosecution of the Co-defendants for criminal charge(s) filed against the Co-defendants in connection with the criminal charge(s) filed against the User. |

FIG. 6C

| Variable | Event Information Associated with User and Corresponding Value |
|---|---|
| A | 1= Arrest Date=no value. |
| | 2= Arrest Date=value. |
| B | 1= (Current Date-Felony Conviction Date)>(Current Date-5 Years). |
| | 2= (Current Date-Felony Conviction Date)<(Current Date-5 Years). |
| | 2= Felony Conviction Date=no value. |
| C | 1= Inmate Status=value |
| | 2= Date Released=value, Case Disposition=dismissed, and Inmate Status=no value, or Case Status=closed. |
| D | 1= Information Issue Date=no value or Indictment Issue Date=no value. |
| | 2= Information Issue Date=value or Indictment Issue Date=value. |
| E | 1= Case Status=open or Case Status=pending. |
| | 2= Case Status=closed. |
| F | 1= any Related Charge(s)=open or Case Disposition(s) for Related Charge(s)=conviction. |
| | 2= Related Charges=closed or =no value. |
| G | 1= Information Status=active or Indictment Status=active. |
| | 2= Information Status=dismissed or Indictment Status=dismissed. |
| | 3= Information Status=No Value or Indictment Status=No Value. |
| H | 1= all Case Disposition(s)=dismissed. |
| | 2= all Case Disposition(s)=acquittal. |
| | 3= an Case Disposition(s)=conviction. |
| I | 1= Court-ordered Community Supervision=value. |
| | 2= Court-ordered Community Supervision=value, and Charge Type=misdemeanor, and Misdemeanor Class=C. |
| | 3= Court-ordered Community Supervision=no value. |

FIG. 7A1

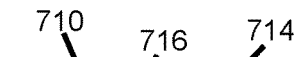
FIG. 7A2

FIG. 7A3

| Variable | Event Information Associated with User and Corresponding Value |
|---|---|
| O | 1= User Pardoned for Offense=yes. |
| | 2= User Pardoned for Offense=no or =no value. |
| P | 1= Current Date>Statue of Limitations Expiration Date. |
| | 2= Current Date<Statue of Limitations Expiration Date. |
| Q | 1= Misdemeanor Class=C, and (Current Date-Arrest Date)<180 Days. |
| | 2= Misdemeanor Class=C, (Current Date-Arrest Date)>180 Days. |
| R | 1= Misdemeanor Class=A or =B, and 12 Months>(Current Date-Arrest Date). |
| | 2= Misdemeanor Class=A or =B, and 12 Months<(Current Date-Arrest Date). |
| S | 1= 36 Months>(Current Date-Arrest Date). |
| | 2= 36 Months<(Current Date-Arrest Date). |
| T | 1= Court-ordered Community Supervision=no value. |
| | 2= Court-ordered Community Supervision=value. |
| | 3= Court-ordered Community Supervision=value, and Charge Type-misdemeanor and Misdemeanor Class=C. |
| U | 1= Charge Type=misdemeanor, and Misdemeanor Class=C, and 180 Days>(Current Date-Arrest Date). |
| | 2= Charge Type=misdemeanor, and Misdemeanor Class=C, and 180 Days<(Current Date-Arrest Date). |
| V | 1= Charge Type=misdemeanor, and Misdemeanor Class=A or =B, and 12 Months<(Current Date-Arrest Date). |
| | 2= Charge Type=misdemeanor, and Misdemeanor Class=A or =B, and 12 Months>(Current Date-Arrest Date). |
| W | 1= Charge Type=felony, and 36 Months<(Current Date-Arrest Date). |
| | 2= Charge Type=felony, and 36 Months>(Current Date-Arrest Date). |
| X | 1= Co-defendants=value, and Case Disposition(s) for any Co-defendants =open. |
| | 2= Co-defendants=value, or Case Disposition(s) for all Co-defendants =closed. |
| Y | 1= Case Disposition for Failure to Appear Charge=conviction or Case Status for Failure to Appear Charge=open. |

| | | |
|---|---|---|
| | 2= Failure to Appear Charge=no value. | |
| | 3= Case Disposition for Failure to Appear Charge=dismissed or =acquittal. | |
| Z | 1= Information Issue Date>(Arrest Date or Case Disposition Date) or Indictment Issue Date>(Arrest Date or Case Disposition Date). | |
| | 2= Information Issue Date<(Arrest Date or Case Disposition Date) or Indictment Issue Date<(Arrest Date or Case Disposition Date). | |
| | 3= Information Issue Date=no value or Indictment Issue Date=no value. | |
| Query 1 | 1= User Response to Query 1=no. | |
| | 2= User Response to Query 1=yes. | |
| Query 2 | 1= User Response to Query 1=no. | |
| | 2= User Response to Query 1=yes. | |
| Query 3 | 1= User Response to Query 1=no. | |
| | 2= User Response to Query 1=yes. | |
| Query 4 | 1= User Response to Query 1=no. | |
| | 2= User Response to Query 1=yes. | |
| Query 5 | 1= User Response to Query 1=no. | |
| | 2= User Response to Query 1=yes. | |
| Query 6 | 1= User Response to Query 1=no. | |
| | 2= User Response to Query 1=yes. | |

| Algorithm expressing Chapter 55 of the Texas Criminal Code | | | | |
|---|---|---|---|---|
| Step 1 | = 1 | = 2 | = 3 | =4 |
| A= | Go to Message 1 | Proceed | | |
| B= | Go to Message 2 | Proceed | | |
| C= | Go to Message 2 | Proceed | | |
| D= | Go to Step10 | Proceed | | |
| E= | Go to Message 2 | Proceed | | |
| F= | Go to Message 2 | Go to Step 2 | Proceed | |
| G= | Go to Message 2 | Proceed | | |
| H= | Go to Step 2 | Go to Step 3 | Go to Step 6 | |
| Step 2 | | | | |
| I= | Go to Message 2 | Go to Step 4 | Proceed | |
| J= | Go to Query 2 | Go to Step 10 | Go to Step 8 | |
| Step 3 | | | | |
| K= | Go to Step5 | Go to Query 2 | | |
| Step 4 | | | | |
| L= | Go to Message 2 | Go to Message 2 | Go to Step 7 | |
| Step 5 | | | | |
| M= | Go to Message 2 | Proceed | | |
| N= | Go to Step 6 | Go to Step 3 | Go to Message 2 | Go to Step 2 |
| Step 6 | | | | |
| O= | Go to Query 2 | Proceed | | |
| Query 1 | Go to Message 2 | Go to Query 2 | | |
| Step 7 | | | | |
| P= | Go to Query 2 | Go to Message 3 | | |
| Step 8 | | | | |
| Q= | Go to Query 2 | Go to Message 4 | | |
| R= | Go to Query 2 | Go to Message 5 | | |
| Step 9 | | | | |
| S= | Go to Step 8 | Go to Message 2 | | |
| Step 10 | | | | |
| T= | Proceed | Go to Message 2 | Go to Step 4 | |
| U= | Go to Query 2 | Go to Message 7 | | |
| V= | Go to Query 2 | Go to Message 7 | | |
| W= | Go to Query 2 | Go to Message 8 | | |
| Y= | Go to Message 2 | Proceed | Proceed | |
| Z= | Go to Message 2 | Go to Query 2 | | |
| Query 2 | Proceed | Fail | | |
| Query 3 | Proceed | Fail | | |
| Query 4 | Proceed | Fail | | |
| Query 5 | Proceed | Fail | | |
| Query 6 | Go to Message 9 | Generate Form | | |

| | |
|---|---|
| Message 1 | No arrests or criminal charges were found matching your name in public record databases. If you want to complete the Expunction forms or enter your own information to see if it qualifies, click here. Go to the Homepage to see view the results of your background check as well as options including generating Notices of Non-Disclosure, pardon applications, and more. |
| Message 2 | It does not appear that you qualify to file a Petition for Expunctio nunder Chapter 55 of the Texas Criminal Code at this time. Go to the Homepage to see view the results of your background check as well as other options including generating Notices of Non-Disclosure, pardon applications, and more. You can also sign up to be sent an alert in the event that you qualify to file a Petition for Expunction in the future. "If =no, proceed. |
| Message 3 | You may not seek an expunction until:*(statute of limitations expiration date).*" Go to the Homepage to see view the results of your background check as well as other options including generating Notices of Non-Disclosure, pardon applications, and more. You can also sign up to be sent an alert in event that you qualify to file a Petition for Expunction in the future. |
| Message 4 | You may not seek an expunction until:*(Arrest Date + 80 days).*" Click Home to see the results of your background check and more options including generating Notices of Non-Disclosure, pardon applications, and more. |
| Message 5 | You may not seek an expunction until:*(Arrest Date + 12 months).*" Go to the Homepage to see view the results of your background check as well as other options including generating Notices of Non-Disclosure, pardon applications, and more. |
| Message 6 | You may seek an expunction at this time only if the prosecution certifies that the arrest records and related files are not needed for use in any criminal investigation or prosecution of the person or another person." Otherwise, you may not seek an expunction until: *(Arrest Date + 180 days).*" Go to the Homepage to see view the results of your background check as well as other options including geneating Non-Disclosure, pardon applications, and more. |

FIG. 7C1

| | | |
|---|---|---|
| | | c |
| Message 7 | | You may seek an expunction at this time only if the prosecution certifies that the arrest records and related files are not needed for use in any criminal investigation or prosecution of the person or of another person. Otherwise, you may not seek an expunction until: *(Arrest Date + 12 months)*. Go to the Homepage to see view the results of your background check as well as other options including generating Notices of Non-Disclosure, pardon applications, and more. |
| Message 8 | | You may seek an expunction at this time only if the prosecution certifies that the arrest records and related files are not needed for use in any criminal investigation or prosecution of the person or of another person. Otherwise, you may not seek an expunction until: *(Arrest Date + 36 Months)*. Go to the Homepage to see view the results of your background check as well as other options including generating Notices of Non-Disclosure, pardon applications, and more. |
| Message 9 | | Although you qualify to file a Petition for Expunction, you may want to contact the Prosecutor associated with your case in order to inquire weather the Prosecutor's office would be willing to tell you in advance if they would challenge your Petition for Expunction of public record information associated with your charge(s) and/or arrest. |
| Query 1 | | Were you subsequently pardoned for the following offense; offense number dated; date of offense? |
| Query 2 | | Have you been convicted of a felony in the last five years? |
| Query 3 | | Were any other individuals also charged at the same time or for the same event as you were charged or arrested for? |
| Query 4 | | Were you convicted of any other charges related to this arrest or criminal offense? |
| Query 5 | | Were you found to have jumped bail or charged and convicted with a Failure to Appear for this offense? |
| Query 6 | | Have you contacted the District Attorney to ask if they would be willing to let you if their office would challange your Petition for Expunction |

/124
Source: Tex. Crim. Proc. Code Ann. art. 55.02, § 2(b)

The petition for expunction must be verified and must include the following or an explanation for why one or more of the following is not included:

- the petitioner's full name, sex, race, date of birth, driver's license number, Social Security number, and address at the time of the arrest—522
- the offense charged against the petitioner—528
- the date the offense charged against the petitioner was alleged to have been committed
- the date the petitioner was arrested—524
- the name of the county where the petitioner was arrested and, if the arrest occurred in a municipality, the name of the municipality
- the name of the agency that arrested the petitioner
- the case number and court of offense—518
- a list of all law enforcement agencies, jails or other detention facilities, magistrates, courts, prosecuting attorneys, correctional facilities, central state depositories of criminal records, and other officials, agencies, or entities of this state or of any political subdivision of the state; central federal depositories of criminal records that the petitioner has reason to believe have records or files subject to expunction; and private entities that compile and disseminate for compensation criminal history record information that the petitioner has reason to believe have information related to records or files that are subject to expunction.

(510, 514, 516, 512, 812, 814)

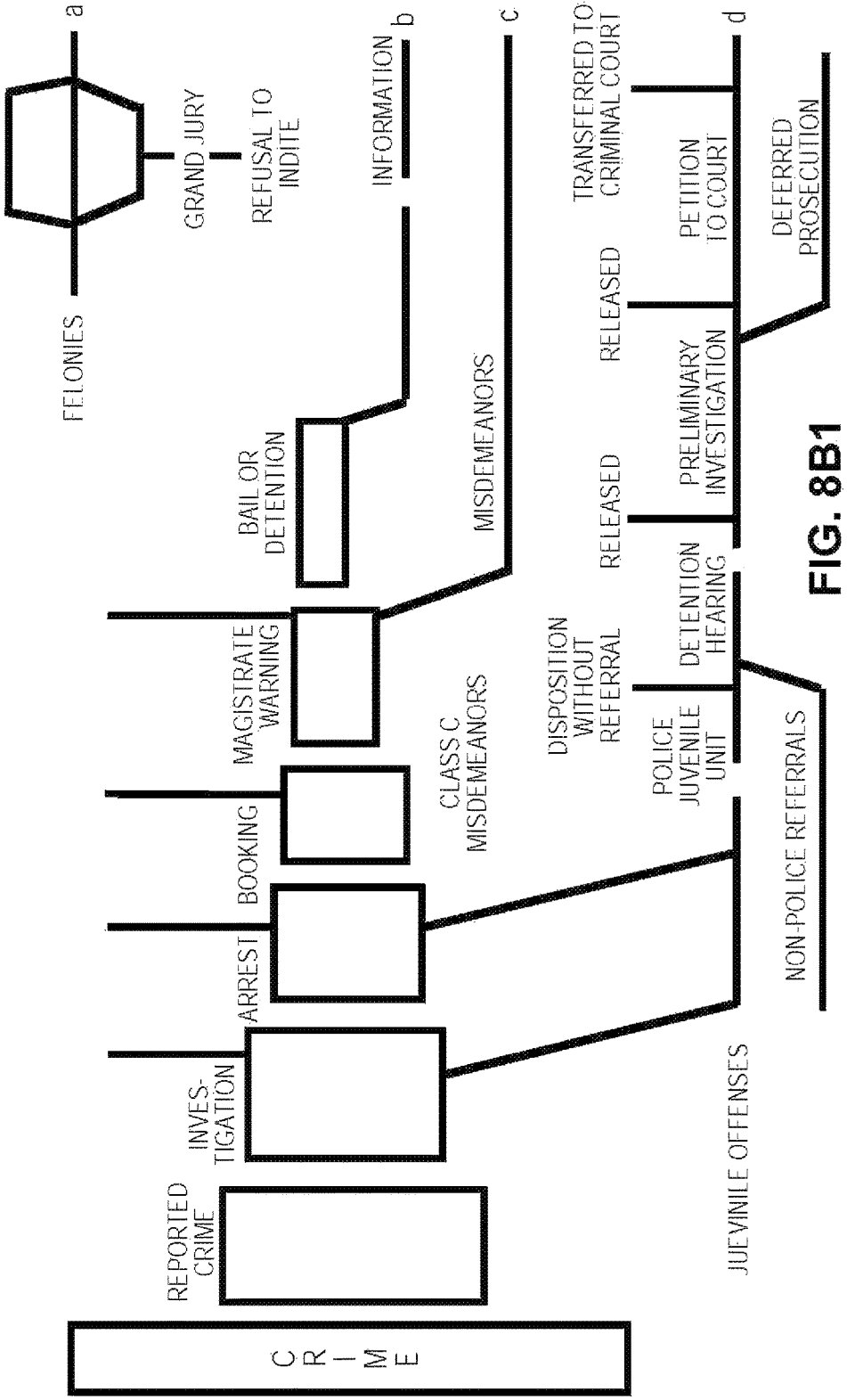
FIG. 8B1

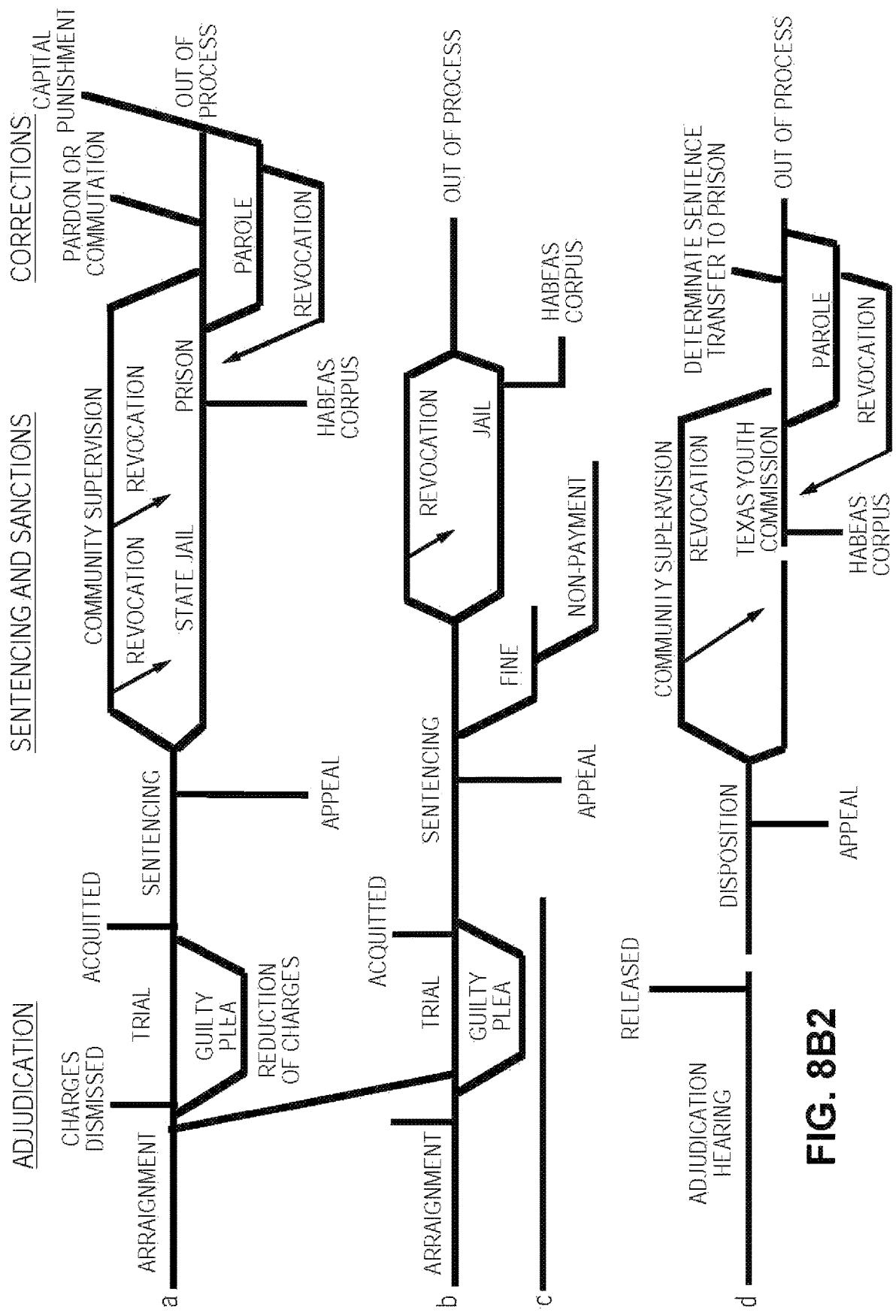
FIG. 8B2

Fig. 8C1

| No. | Item Reported | Report Name | Report Recipient & Address |
|---|---|---|---|
| 1 | Court Order - Chemical Dependency Treatment | | Texas Department of Public Safety Drivers Improvement Bureau P.O. Box 4087 Austin, TX 78773-0361 |
| 2 | Court Order - Costs in Parental Notification Suit for ad litems, court costs or court reporters to be paid by state | | Accounting Division Attn: Staff Service Officer Texas Department of State Health Services P.O. Box 149347 Austin, TX 78714-9347 |
| 3 | Court Order - Occupational Driver's License granted (or revocation of occupational driver's license) | | Texas Department of Public Safety Safety Responsibility P.O. Box 15999 Austin, TX 78761-5999 |
| 4 | Court Order - Order of Nondisclosure | | Texas Department of Public Safety P.O. Box 4143 Austin, TX 78765-4143 Attn: Expunctions |
| 5 | Court Order - Protective Order based on criminal defendant's cocummission of offense because of bias or prejudice | | Regulatory Licensing Service MSC 0245 Texas Department of Public Safety P.O. Box4087 Austin, TX 78773-0245 |

Clerk Reporting Requirements ← 126
January 2008

824 →

| Form No/Contact Information | Time Reported | Legal Citations | Notes |
|---|---|---|---|
| (512) 424-5720 | Before the 10th day after the date the court enters the order | Transportation Code § 521.319 | Clerk must notify DPS of the court order so that DPS may revoke the driver's licence of the person who is the subject of the order. |
| (512) 458-7111 ext. 3945 | Not later than the 90th day after the date of the final ruling | Family Code § 33.007<br><br>Texas Parental Notification Rule 1.9(b)(2),(4) | Clerk must "direct" copy of court order to Comptroller who shall pay the amount ordered from funds appropriated to the Texas Department of State Health Services. But copy of order is actually sent to the Texas Department of State Health Services instead of to the Comptroller. |
|  | No stated time frame, but implication is immediately after issuance of the order | Transportation Code § 521.249 | Clerk is to send certified copy of the petition and court order granting the occupational licence. The order is to set out the judge's findings and restrictions in regard to issuance of the licence. Similarly, subsequently revoke the licence, the clerk must send a certified copy of the order. |
| expunction@txdps.state.tx.us | Not later than the 15th business day after the date an order of nondisclosure is issued | Government Code § 411.081 | Clerk is to send to DPS all relevant criminal history record information contained either in (1) the order, or (2) a copy of the order.<br>Clerk is to send the material by certified mail, return request required, or secure electronic mail, electronic transmissions, or fax transmissions. |
| chi@txdps.state.tx.us<br>(512) 424-7293 or<br>(512) 424-7294<br>Helpline: (800) 224-5744 | No stated time frame, but implication is immediately after issuance of the order | Code of Criminal Procedure, art. 6.08 | Clerk is to send a copy of the order to the DPS "with a designation indicating that the order was issued to prevent offences committed because of bias or prejudice." |

Fig. 8C2

| 1 | COURT | COURT TYPE | COUNTY | ADDRESS | CITY | ZIP CODE | PHONE |
|---|---|---|---|---|---|---|---|
| 108 | District Clerk Office | District Clerk Office | Anderson | 500 N Church St. Rm 18 | Palestine | 75801 | (903)723-7412 |
| 109 | 3rd District Court | District | Anderson | 500 N Church St. Ste 30 | Palestine | 75801 | (903)723-7415 |
| 110 | 87th District court | District | Anderson | 500 N Church St. Ste 30 | Palestine | 75801 | (903)723-7415 |
| 111 | 349th District Court | District | Anderson | 500 N Church St. Ste 30 | Palestine | 75801 | (903)723-7415 |
| 112 | County Clerk Office | County Clerk Office | Anderson | 500 N Church St. Rm 10 | Palestine | 75801 | (903)723-7432 |
| 113 | County Court | County Constitutional Court | Anderson | 703 N Mallard St. Ste 101 | Palestine | 75801 | (903)723-7406 |
| 114 | County Court of Law | County Court of Law | Anderson | 500 N Church St. Ste 11 | Palestine | 75801 | (903)723-7469 |
| 115 | Precinct 1 Place 1 | Justice of the Peace | Anderson | P O Box 348 | Elkhart | 75839 | (903)764-5661 |
| 116 | Precinct 2 Place 1 | Justice of the Peace | Anderson | 703 N Mallard St. #107 | Palestine | 75801 | (903)723-7486 |
| 117 | Precinct 3 Place 1 | Justice of the Peace | Anderson | 500 N Church St. Ste 8 | Palestine | 75801 | (903)723-7418 |
| 118 | Precinct 4 Place 1 | Justice of the Peace | Anderson | 703 N Mallard St. #106 | Palestine | 75801 | (903)723-7419 |
| 119 | Elkhart | Municipal | Anderson | P O Box 944 | Elkhart | 75839 | (903)764-5661 |
| 120 | Frankston | Municipal | Anderson | P O Box 186 | Frankston | 75763-0186 | (903)876-2400 |
| 121 | Palestine | Municipal | Anderson | 504 N Queen St | Palestine | 75801-2733 | (903)731-8433 |

| 832 | 834 |
|---|---|
| Bexar | Bexar Co SO |
| | Alamo Heights PD |
| | Balcon Heights PD |
| | Bexar County Constable Precinct 1 |
| | Bexar County Constable Precinct 2 |
| | Bexar County Constable Precinct 3 |
| | Bexas County Constable Precinct 4 |
| | Castle Hills PD |
| | Converse PD |
| | Edgewood ISD PD |
| | Elmendorf PD |
| | Fair Oaks Ranch PD |
| | Grey Forest PD |
| | Helotes PD |
| | Hill Aountry Village PD |
| | Hollywood Park PD |
| | Kirby PD |
| | Leon Valley PD |
| | Live Oak PD |
| | Lytle PD |
| | Northside ISD PD |
| | Olmos Park PD |
| | Our Lady of the Lake University PD |
| | San Antonio PD |
| | San Antonio ISD PD |
| | San Antonio Park Police |
| | Shavano Park, City of, PD |

FIG. 9A

| Source or Recipient of Event Information associated with the User | Variable | Felony | Class A Misdemeanor | Class B Misdemeanor | Class C Misdemeanor |
|---|---|---|---|---|---|
| County Name | A | Name of County where User was arrested, where the offense occured, and/or where case was prosecuted. | Name of County where User was arrested, where the offense occured, and/or where case was prosecuted. | Name of County where User was arrested, where the offense occured, and/or where case was prosecuted. | Name of County where User was arrested, where the offense occured, and/or where case was prosecuted. |
| Prosecutor | B | District Attorney in A | District and/or County Attorney in A | District and/or County Attorney in A | County, District, JOP, and/or Municipal Attorney in A |
| Arresting Agency | C | Arresting Agency if Arrest Date=value | Arresting Agency if Arrest Date=value | Arresting Agency if Arrest Date=value | Arresting Agency if Arrest Date=value |
| Magistrate | D | Arrest Date=value | Arrest Date=value | Arrest Date=value | Arrest Date=value |
| Court | E | District Court in A | District and/or County Court in A | County, District, JOP, and/or Municipal in A | County, District, JOP, and/or Municipal in A |
| Court Clerk | F | District Clerk in A | District and/or County Clerk in A | District and/or County Clerk in A | County, District, JOP, and/or Municipal Clerk in A |
| Bail Bond | G | Arrest Date=value, and Bail Bond=value or PR Bond=value. | Arrest Date=value, and Bail Bond=value or PR Bond=value. | Arrest Date=value, and Bail Bond=value or PR Bond=value. | Arrest Date=value, and Bail Bond=value or PR Bond=value. |
| Texas Department of Public Safety | H | Include this Agency | Include this Agency | Include this Agency | Include this Agency |

| a | b | c | d | e | f | g |
|---|---|---|---|---|---|---|
| FBI | I | Include this Agency | Include this Agency | Include this Agency | Include this Agency | Include this Agency |
| SHERIFF'S OFFICE | J | If B=J or if = warrant issued = value or Failure to Appear Change= value | If B=J or if = warrant issued = value or Failure to Appear Change= value | If B=J or if = warrant issued = value or Failure to Appear Change= value | If B=J or if = warrant issued = value or Failure to Appear Change= value | If B=J or if = warrant issued = value or Failure to Appear Change= value |
| Texas Crime Information Center | K | Include this Agency | Include this Agency | Include this Agency | Include this Agency | Include this Agency |
| Other State Agencies | L | State Agency Recipients of public records information from law enforcement agencies based on Data Migration Policies of those state agencies. | State Agency Recipients of public records information from law enforcement agencies based on Data Migration Policies of those state agencies. | State Agency Recipients of public records information from law enforcement agencies based on Data Migration Policies of those state agencies. | State Agency Recipients of public records information from law enforcement agencies based on Data Migration Policies of those state agencies. | State Agency Recipients of public records information from law enforcement agencies based on Data Migration Policies of those state agencies. |
| Data Migration Policy of other State Agencies possessing the User Individual's Arrest Records | M | State Agencies named in public record information associated with the User | State Agencies named in public record information associated with the User | State Agencies named in public record information associated with the User | State Agencies named in public record information associated with the User | State Agencies named in public record information associated with the User |

| Field No. | Type of Information | Event and Personal Information associated with User | Source of Event and Personal Information |
|---|---|---|---|
| 1 | Full Name | John Doe | Secured Third Party Service Provider Login and/or Event Information |
| 2 | Sex | Male | Secured Third Party Service Provider Login and/or Event Information |
| 3 | Race | White | Secured Third Party Service Provider Login and/or Event Information |
| 4 | Date of Birth | April 15, 1988 | Secured Third Party Service Provider Login and/or Event Information |
| 5 | Driver's License Number | 12345678 | Event Information (Arrest Records and/or Case Disposition Records) |
| 6 | Last 4 Digits of Social Security # | 1234 | Secured Third Party Service Provider Login and/or Event Information |
| 7 | Address at time of Arrest | 123 Elm St., Houston, Texas 77070 | Event Information (Arrest Records and/or Case Disposition Records) |
| 8 | Offense Charged | Public Intoxication-Alcohol PC §49.02 (Class C Misdemeanor) | Event Information (Arrest Records and/or Case Disposition Records) |
| 9 | Offense Date | November 1, 2010 | Event Information (Arrest Records and/or Case Disposition Records) |
| 10 | Arrest Date | November 1, 2010 | Event Information (Arrest Records and/or Case Disposition Records) |
| 11 | County Name | Fort Bend | Event Information (Arrest Records and/or Case Disposition Records) |
| 12 | Municipality Name | Richmond | Event Information (Arrest Records and/or Case Disposition Records) |
| 13 | Arresting Agency | Fort Bend Police Department | Event Information (Arrest Records and/or Case Disposition Records) |
| 14 | Officer's Name and/or Badge Number | Officer Noe Zubarra (P00125074) | Event Information (Arrest Records and/or Case Disposition Records) |
| 15 | Case Number | 12-CCR-153641 | Event Information (Arrest Records and/or Case Disposition Records) |
| 16 | Court Name | County Court of Law #4 | Event Information (Arrest Records and/or Case Disposition Records) |
| 17 | Dismissal Date | February 23, 2011 | Event Information (Arrest Records and/or Case Disposition Records) |
| 18 | Reason for Dismissal | "No Probable Cause for Arrest" and "Other" | Event Information (Arrest Records and/or Case Disposition Records) |
| 19 | Current Address Street and Number | 123 Elm St. | Secured Third Party Service Provider Login and/or Event Information |
| 20 | Current Address City, State, and Zip code | Houston, Texas 77070 | Secured Third Party Service Provider Login and/or Event Information |
| 21 | Phone Number | (281)-555-5555 | Secured Third Party Service Provider Login and/or Event Information |
| 22 | Court for Expunction Hearing | Distric Court | Event Information (Arrest Records and/or Case Disposition Records) and Event-related Agency Information |
| 23 | City of Court for Expunction Hearing | Richmond | Event-related Agency Information |

Fig. 10A

| Field No. | Line 1 (Name of State Entity) | Line 2 (Attention: Expunctions) | Line 3 (Address Street and number) | Line 4 (Address City, State, and Zip Code) |
|---|---|---|---|---|
| A1 | Fort Bend Police Department | Attn: Expunctions | 13600 Murphy Road | Stafford, Texas 77477 |
| A2 | Fort Bend County District Attorney | Attn: Expunctions | 401 Jackson St. | Richmond, Texas 77469 |
| A3 | Fort Bend County District Clerk | Attn: Expunctions | 301 Jackson St. | Richmond, Texas 77469 |
| A4 | Fort Bend County Court #4 | Attn: Expunctions | 301 Jackson St. | Richmond, Texas 77469 |
| A5 | Fort Bend County Jail | Attn: Expunctions | 1410 Ransom Rd. | Richmond, Texas 77469 |
| A6 | Texas Department of Public Safety | Attn: Expunctions MSC 024 | P.O. Box 4143 | Austin, Texas 78765 |
| A7 | Texas Crime Information Center | Attn: Expunctions | P.O. Box 4143 | Austin, Texas 78765-4145 |
| A8 | Federal Bureau of Investigation | Attn: Expunctions | 170 Marcel Drive | Winchester, VA 22602-4843 |

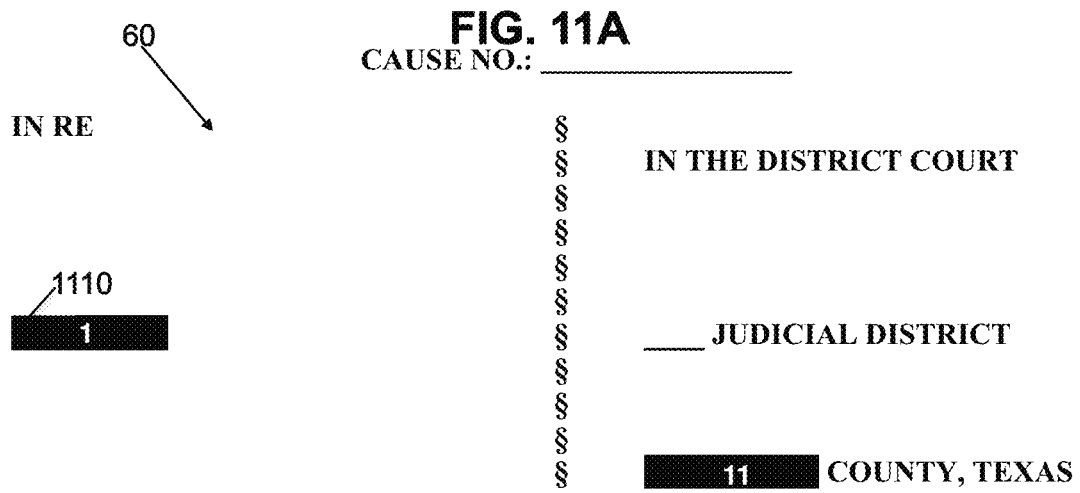

CAUSE NO.: _____

IN RE 60

1110
■ 1 ■

§
§    IN THE DISTRICT COURT
§
§
§
§
§    ___ JUDICIAL DISTRICT
§
§
§
§    ■ 11 ■ COUNTY, TEXAS

PETITION FOR EXPUNCTION

TO THE HONORABLE JUDGE OF THIS COURT:

My name is: ■ 1 ■

I am representing myself in this Petition for Expunction of Records. I am entitled to have my records expunged under Chapter 55 of the Texas Code of Criminal Procedure for the following reason:

I.   Grounds for Expunction:   124

I am entitled to have my records and files concerning the arrest expunged for the following reason:

1. I have been released from custody on this charge.

2. The charges against me arising out of the transaction for which I was arrested have not resulted in a final conviction and are no longer pending.

3. The charge against me was dismissed at the direction of the State of Texas, by and through her Attorney's filing of a Motion to Dismiss signed by the Judge of the ■ 16 ■ in ■ 11 ■ County, Texas on ■ 17 ■ because ■ 18 ■ ■ 18 ■.

4. There was no court-ordered probation under Article 42.12 of the Code of Criminal Procedure on this matter.

5. More than one year has passed since the date of my arrest on ■ 10 ■ and there was no felony charge arising from the same transaction.

FIG. 11B

II. Arrest/Offense to be Expunged:

I was arrested on: [ 10 ] —524

I was arrested in the city of [ 12 ] in [ 11 ] County, Texas.

The offense was alleged to have occurred on [ 9 ]

I was arrested by: [ 14 ] of the [ 13 ]

I was arrested for: [ 8 ] —528

My case number is: [ 15 ] and court number is [ 16 ] of [ 11 ] County, Texas. —518

512

The case was resolved when charges were dismissed on [ 17 ].

III. Criminal Justice Agencies: —814

I believe the following criminal justice agencies have records or files relating to this Petition for Expunction. They should be served with notice of this motion.

| A1 | A5 —1018, —1020, —1022, —1024 |
|---|---|
| A2 | A6 |
| A3 | A7 |
| A4 | A8 |

FIG. 11C

IV. Identifying Information:—812

I provide the following information about myself to assist the agencies listed above in clearing my record:

My full name is: ▮1▮ ⟵510
  a. I am: ▮2▮ —516
  b. My race is: ▮3▮ —514
  c. The last four digits of my social security number are: ▮6▮.
  d. My Texas Driver's License number is: ▮5▮.
  e. My Date of Birth is: ▮4▮.
  f. At the time of the arrest, I lived at the following address: ▮7▮.    522

V. Relief Requested:

I ask the court to set this case for a hearing, and to give reasonable notice to the hearing to each agency listed above. After a hearing on this matter, I ask the Court to order each agency to:

a. To give reasonable notice of the hearing to each official, agency, or other public entity named in Paragraph III of this petition pursuant to Article 55.02, section 2 of the Texas Code of Criminal Procedure.

b. After hearing on this matter, to order each official, agency, or other public entity that there is reason to believe possesses records or files concerning the arrest to:

I. Return all records and files concerning the arrest to the court, or if removal is impracticable, to obliterate all references to Petition and notify the court of its action.

II. Request each central federal depository to which it supplied information concerning the arrest of Petitioner to return all such records and files to the Court, or if removal is impracticable, to obliterate all references to Petition and notify the court of its action.

III. Delete from its public records all index references to the above-mentioned arrest of the Petitioner.

c. To direct the clerk of the court to send a certified copy of the order by certified mail, return receipt requested, to the Texas Department of Public Safety and to each official, agency, or other entity named in Paragraph III of the Petition; and to direct the Texas Department of Public Safety to send to each federal depository an explanation of the effect of the order as well as a request for the return or destruction of the records held by the central federal depository.

d. To return to me, all records, files, and notifications of the disposition of records and files returned to the court pursuant to its expunction order within a reasonable time of the receipt of the same.

Respectfully Submitted,

FIG. 11E

ORDER SETTING HEARING DATE

IT IS ORDERED that the hearing on the Petition for Expunction of Records is hereby set for _____ [time], on the _____ day of, in the courtroom of the ███ 22 ███, in ███ 23 ███, Texas.

SIGNED this the _____ day of _____ .

_____

JUDGE PRESIDING

FIG. 12A

CAUSE NO.: _____

| | | |
|---|---|---|
| IN RE | § § § § § § | IN THE DISTRICT COURT |
| JOHN DOE | § § § § § | ____ JUDICIAL DISTRICT |
| | § | FORT BEND COUNTY, TEXAS |

PETITION FOR EXPUNCTION

TO THE HONORABLE JUDGE OF THIS COURT:

My name is: <u>John Doe.</u>

I am representing myself in this Petition for Expunction of Records. I am entitled to have my records expunged under <u>Chapter 55 of the Texas Code of Criminal Procedure</u> for the following reason:

I. Grounds for Expunction:   124

I am entitled to have my records and files concerning the arrest expunged for the following reason:

1. I have been released from custody on this charge.

2. The charges against me arising out of the transaction for which I was arrested have not resulted in a final conviction and are no longer pending.

3. The charge against me was dismissed at the direction of the State of Texas, by and through her Attorney's filing of a Motion to Dismiss signed by the Judge of the County Court at Law #4 in Fort Bend County, Texas on February 23, 2011 because "No Probable Cause for arrest" and "Other".

4. There was no court-ordered probation under Article 42.12 of the Code of Criminal Procedure on this matter.

5. More than one year has passed since the date of my arrest on November 1, 2010 and there was no felony charge arising from the same transaction.

FIG. 12B

II. Arrest/Offense to be Expunged:

I was arrested on: November 1, 2010. —524

I was arrested in the city of Richmond in Fort Bend County, Texas.

The offense was alleged to have occurred on November 1, 2010.

I was arrested by: Officer Noe Zubarra (P00125074) of the Fort Bend Police Department.

I was arrested for: Public Intoxication- Alcohol PC § 49.02 (Class C Misdemeanor). —528

My case number is: 12-CCR-153641 and court number is County Court Of Law #4 of Fort Bend County, Texas. —518
512

The case was resolved when charges were dismissed on February 23, 2011.

III. Criminal Justice Agencies: —814

I believe the following criminal justice agencies have records or files relating to this Petition for Expunction. They should be served with notice of this motion.

Fort Bend Police Department
Attn: Expunctions
13600 Murphy Road
Stafford, Texas 77477

Fort Bend County Jail —1018
Attn: Expunctions —1120
1410 Ransom Rd. —1122
Richmond, TX 77469 —1124

Fort Bend County District Attorney
Attn: Expunctions
401 Jackson St.
Richmond, Texas 77469

Texas Department of Public Safety
Attn: Expunctions, MSC 0234
P.O. Box 4143
Austin, Texas 78765

Fort Bend County District Clerk
Attn: Expunctions
301 Jackson Street
Richmond, Texas 77469

Texas Crime Information Center
Attn: Expunctions
P.O. Box 4143
Austin, Texas 78765-4145

Fort Bend County Court #4
Attn: Expunctions
301 Jackson Street
Richmond, Texas 77469

Federal Bureau of Investigation
Record Information/Dissemination Section
170 Marcel Drive
Winchester, VA 22602-4843

FIG. 12C

IV. Identifying Information: /812

I provide the following information about myself to assist the agencies listed above in clearing my record:

My full name is: John Doe. /510
 a. I am: Male —516
 b. My race is: White /514
 c. The last four digits of my social security number are: 1234.
 d. My Texas Driver's License number is: 12345678.
 e. My Date of Birth is: April 15, 1988.
 f. At the time of the arrest, I lived at the following address: 123 Elm St., Houston, Texas 77070. /522

V. Relief Requested:

I ask the court to set this case for a hearing, and to give reasonable notice to the hearing to each agency listed above. After a hearing on this matter, I ask the Court to order each agency to:

a. To give reasonable notice of the hearing to each official, agency, or other public entity named in Paragraph III of this petition pursuant to Article 55.02, section 2 of the Texas Code of Criminal Procedure.

b. After hearing on this matter, to order each official, agency, or other public entity that there is reason to believe possesses records or files concerning the arrest to:

I. Return all records and files concerning the arrest to the court, or if removal is impracticable, to obliterate all references to Petition and notify the court of its action.

II. Request each central federal depository to which it supplied information concerning the arrest of Petitioner to return all such records and files to the Court, or if removal is impracticable, to obliterate all references to Petition and notify the court of its action.

III. Delete from its public records all index references to the above-mentioned arrest of the Petitioner.

c. To direct the clerk of the court to send a certified copy of the order by certified mail, return receipt requested, to the Texas Department of Public Safety and to each official, agency, or other entity named in Paragraph III of the Petition; and to direct the Texas Department of Public Safety to send to each federal depository an explanation of the effect of the order as well as a request for the return or destruction of the records held by the central federal depository.

FIG. 12D d. To return to me, all records, files, and notifications of the disposition of records and files returned to the court pursuant to its expunction order within a reasonable time of the receipt of the same.

Respectfully Submitted,

_____

John Doe
123 Elm St.
Houston, Texas 77070
(281)-555-5555

FIG. 12E

ORDER SETTING HEARING DATE

IT IS ORDERED that the hearing on the Petition for Expunction of Records is hereby set for _____ [time], on the _____ day of ____, in the courtroom of Fort Bend District Court, in Richmond, Texas.

SIGNED this the _____ day of _____ .

------------------------------------
JUDGE PRESIDING

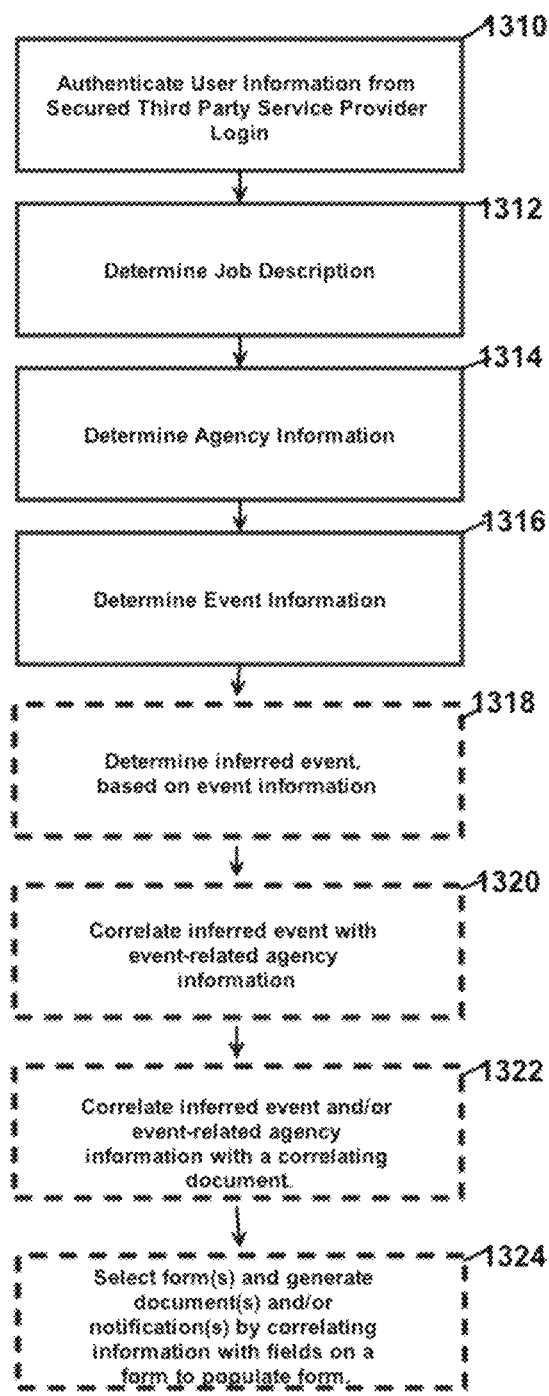

SYSTEM, METHOD, AND PROCESS FOR THE AUTOMATIC GENERATION OF DOCUMENTS

CLAIM OF PRIORITY TO PRIOR APPLICATION

This application claims the benefit of the filing date of U.S. Provisional Application Ser. No. 61,889,043, filed on Oct. 10, 2013, entitled "System, Method, and Process for the Automatic Generation of Documents", the entire disclosure of which is hereby incorporated by reference into the present disclosure.

BACKGROUND OF THE INVENTION

1. Field of the Invention

The present invention is in the field of data correlation and automatic document generation. Specifically the invention relates to a system that identifies and retrieves event information and personal information associated with a user, as well as agency information, including event-related agency information, to identify and automatically generate correlating documents, including documents like personalized legal petitions and contracts, that include agency information, event information, and/or personal information associated with a user.

SUMMARY OF THE INVENTION

The present invention is directed generally to data correlation and automatic document generation, and is directed more particularly to the collection, aggregation, and analysis of agency information, event-related agency information, personal information, and event information associated with a user, including arrest and case disposition information associated with a user, and the provision of aggregated public record information to be used for the automatic generation of related documents, and/or along with other data collected from secured third party service providers, for use by a user to automatically generate documents.

Specifically, the invention is a system, process, and method for the automatic generation of documents that correlate with event and personal information associated with a user, and agency information, including event-related agency information. The system collects personal information associated with a user, possibly through a secured third party service provider login that allows the system to authenticate a user upon login to the system.

Once a user is authenticated, the system collects event information associated with a user by receiving, through secured transfer or other means, event information from event information databases that correlate with personal information associated with a user. The system then correlates event information associated with a user with agency information, including event-related agency information that may be received, through secured transfer or other means, from agency information databases. The system may then determine if a user may benefit from a correlating document based on the correlation between event information associated with a user and event-related agency information. The system may assign values to event information in order for the event information to be used as variables in the system's algorithm(s) that correlates event information with event-related agency information. The system may then identify a document that may be of interest and/or beneficial to a user based on the correlation of agency information, event information, and personal information associated with a user. The system may then formats the different kinds of information into a format that correlates with the format of a correlating document, and places the information on data tables on a system database. Specific data fields within a data table correlate with numbered fields on a form used to generate a document. The form, once populated with the information from correlating data fields in a data table, is designed to generate a personalized document. The invention also correlates numbered fields in a document with relevant agency information to generate a document that correlates with agency information. A user of the system may be an attorney or an individual, hereinafter referred to as "user", who is interested in drafting documents, including filing or responding to litigation with legal documents, by more efficiently drafting documents, including legal documents.

According to one general aspect, a method includes but is not limited to determining agency information and event information, and personal information, wherein the event information is related to a plurality of events, of which at least one event may be associated with an individual. The method further includes but is not limited to correlating the event and event-related agency information within the agency information, and correlating the event-related agency information with a document, and generating a document by correlating the various types of information with fields on a form that correlate with the information. A user may also select a document to be generated by the system. The system may then populate fields on a form with correlating information associated with a user, and query a user for any remaining information required to populate the remainder of a form. The system may then correlate information entered by a user, with information, including event information, personal information, and event-related agency information, in order to identify user errors or suggest corrections or information for a particular field.

According to another general aspect, a system includes but is not limited to an acquisition system that is operable to determine agency information and event information wherein the event information is related to a specific event, of which at least one event is associated with a user, and a document generating system that is operable to correlate the event and event-related agency information within the agency information, with a correlating document, to generate a personalized document that is associated with a user and that complies with and/or includes personal information, event information, and/or event-related agency information.

According to another general aspect, a method includes but is not limited to correlating information, including personal and event information, associated with a user, with event-related agency information and assigning values to the event information to be entered into an algorithm that correlates event-related agency information with a correlating document that may benefit a user, and generating a correlating document that includes event information and event-related agency information in the correlating document.

According to another general aspect, a method includes determining agency information, determining an event from event information, the event being associated with a user, determining an inferred event from the event, based on a rule associated with the event, correlating the inferred event with inferred event-related agency information within the agency information, and correlating the event information and/or event-related agency information with a correlating document, and generating that document by populating fields on the document that correlate with event-related agency information, event information, and personal information associated with a user, that includes the inferred event-related agency information, and that complies with document-related agency information.

Many other objects, features, advantages, benefits, improvements and non-obvious unique aspects of the present invention, as well as the prior problems, obstacles, limitations and challenges that are addressed, will be evident to the reader who is skilled in the art, particularly when this application is considered in light of the prior art. It is intended that such objects, features, advantages, benefits, improvements and non-obvious unique aspects are within the scope of the present invention; the scope of which is limited only by the claims of this and any related patent applications and any amendments thereto.

To the accomplishment of all the above, it should be recognized that this invention may be embodied in the form illustrated in the accompanying drawings, with attention being called to the fact, however, that the drawings are illustrative only, and that changes may be made in the specifics illustrated or described.

BRIEF DESCRIPTION OF THE DRAWINGS

A better understanding of the invention may be obtained from the drawings as described in greater detail in the DETAILED DESCRIPTION OF PREFERRED EMBODIMENT section which follows:

FIG. 1C is a closer view of the Forms databases and Secured Third Party Service Providers Databases in the system diagram in FIG. 1A.

FIG. 2C is an example of a personalized notification shown in FIG. 1A.

FIG. 3 is a flowchart system process for generating documents and/or notifications.

FIG. 5 illustrates an example of an event record containing event information.

FIGS. 6A-C are an illustration of an example data table on the system database that may be populated with event information associated with a user.

FIGS. 7A1-4 illustrates an example of the event information component of the algorithm.

FIG. 7B illustrates an example of the event-related agency information component of an algorithm FIGS. 7C1-2 illustrates an example data tables with messages and queries that the system may communicate to a user, based on the instructions of the algorithm in FIGS. 7A1-4 and 7B.

FIG. 8A illustrates an example of event-related agency information, Chapter 55 of the Texas Criminal Code.

FIGS. 8B1-2 illustrates an example of event-related agency information, Texas Criminal Justice Process.

FIGS. 8C1-2 illustrates an example of event-related agency information, data migration policy for a court clerk.

FIGS. 8D illustrates an example of event-related agency information, a list of courts with contact information.

FIGS. 8E illustrates an example of event-related agency information, a list of law enforcement agencies.

FIG. 9A-B illustrates an example of an algorithm used by the system 10 to calculate the data migration of public records information.

FIG. 10A illustrates an example of a data table that contains data fields of event information and person information associated with a user.

FIGS. 10B illustrates an example of a data table that contains data fields of event information associated with a user and event-related agency information.

FIG. 11A thru FIG. 11E illustrates example of form documents used to generate a petition for expunction.

FIG. 12A thru FIG. 12E illustrates an example of a Petition for expunction generated by the system.

FIG. 13 is a flowchart of a system process for generating documents and/or notifications.

DETAILED DESCRIPTION OF PREFERRED EMBODIMENT

Figure 1A:
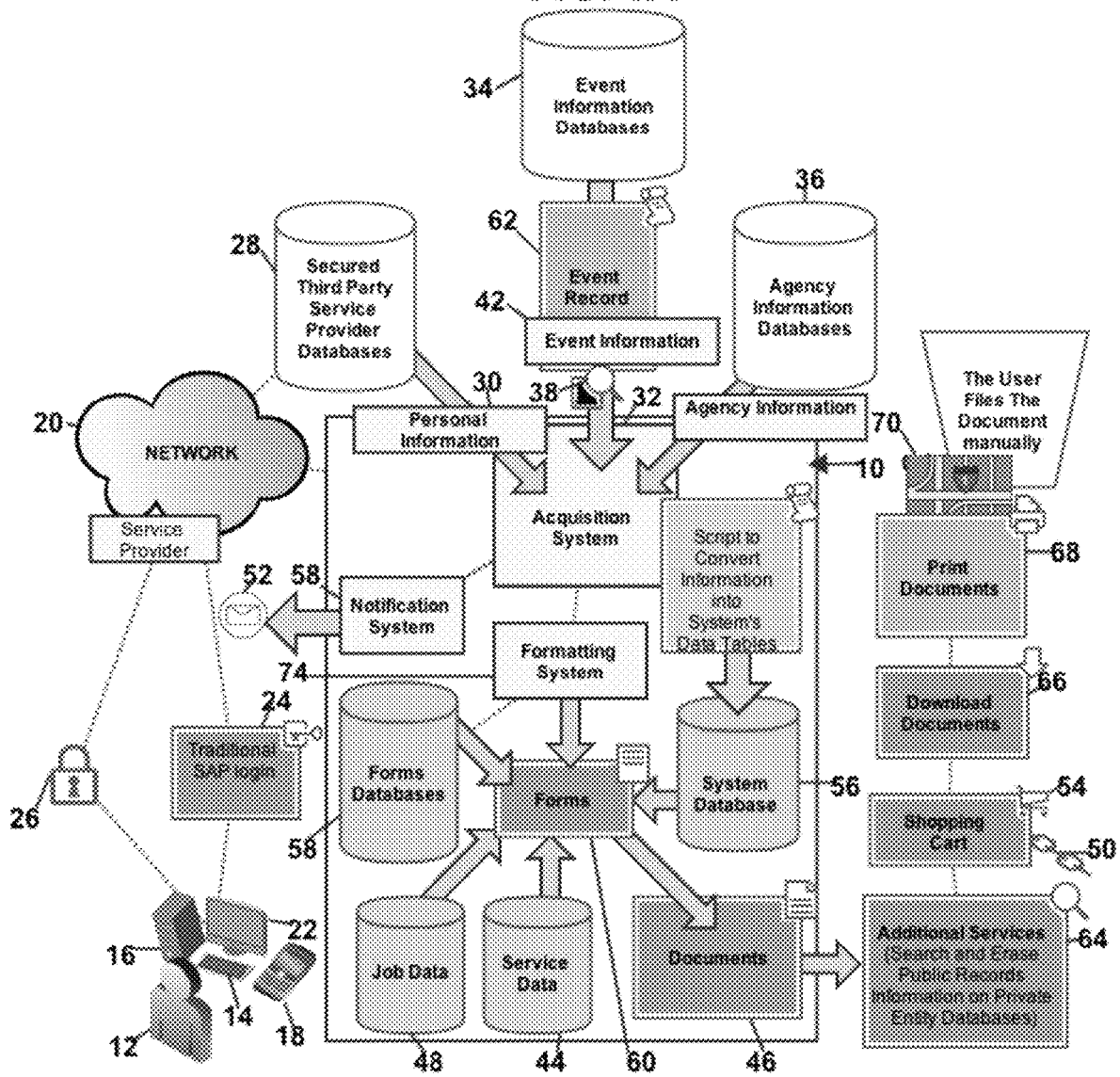
FIG. 1A illustrates a system diagram of a system for data analysis and automatically generating documents and notifications.
Figure 1B:
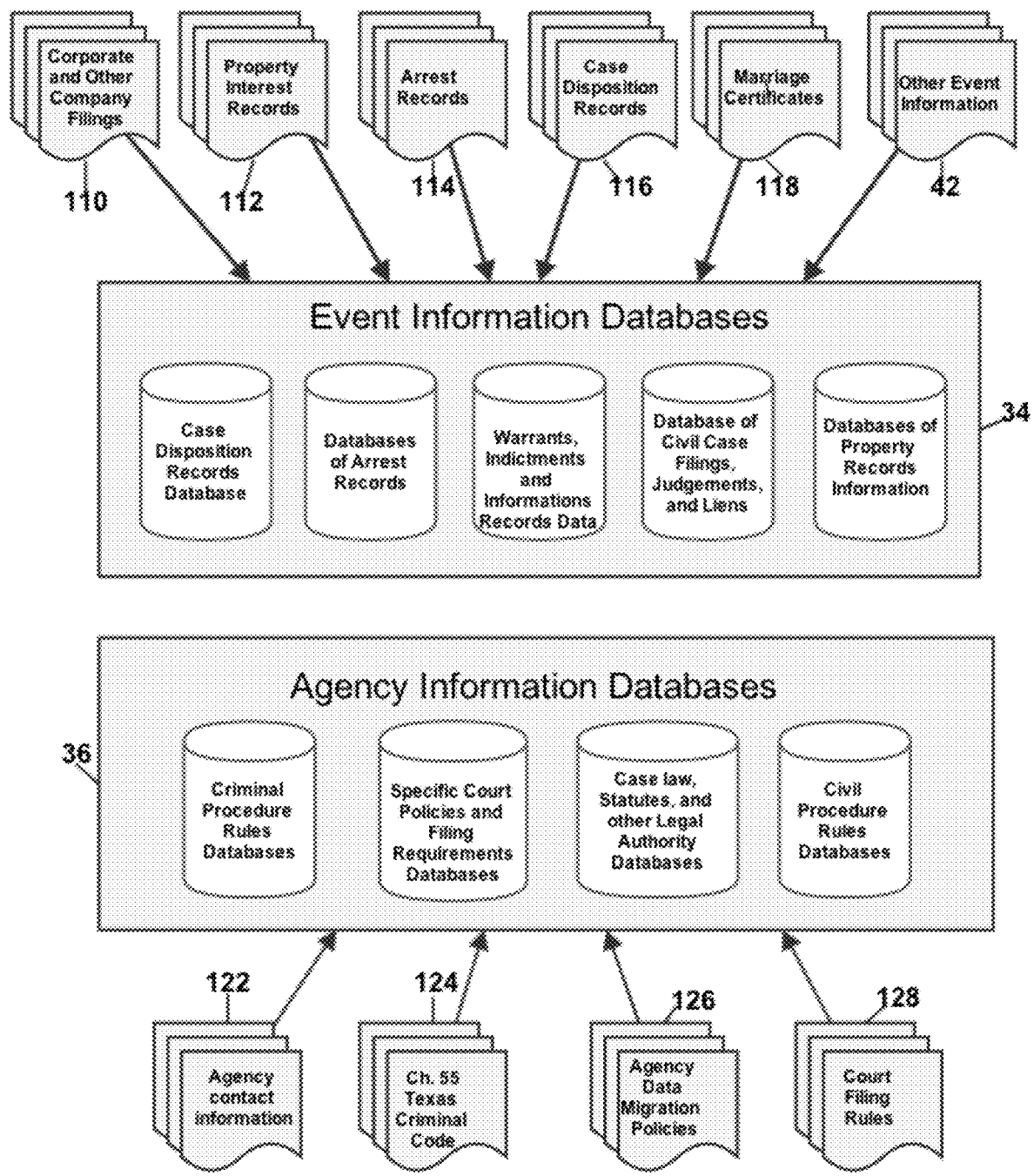
FIG. 1B is a closer view of the agency information databases and event information databases in the system diagram in FIG. 1A.

FIG. 1 is a block diagram of a system 10 for automatically generating documents. In the example of FIG. 1, the system 10 is operable to provide highly targeted and specialized documents and additional services 64, including the sending daily follow-up search queries to event information databases 334 to provide the user 12 with monitoring and analysis of event information 42 associated with a user 12 or the client(s) of a user 12.

The system 10 may be accessed by an individual, or agent of an individual, referred to hereafter as "user" 12, using a keyboard 14 attached, including wirelessly, to a computer 16 or mobile device 18 that is connected to the system 10, for example, over a network 20, such as the internet. A user 12 views and interacts with the system 10 through an interface 22 visible on the screen of the computer 16 or mobile device 18. The system 10 may be connected to a printer 68 or other device that may enhance a user's 12 experience and/or interactions with the system 10 and should be apparent to those familiar with the technology described.

The system 10 will prompt a user 12 to enter his username and password FIG. 2C to access the system 10. An individual may become a user 12 of the system 10 by typing in the individual's login information (e.g., username and password) for an active account with a secured third party service provider 26 (e.g., such as Facebook, LinkedIn, Westlaw, Wolfram Alpha, etc.). A user 12 may also access the system 10 using a traditional sap account login 24 and log in directly to the system 10 without providing a user's 12 account login information to a secured third party service provider 26.

If a user 12 elects to access the system 10 using the secured third party service provider login 26, the system 10 calls out by secure connection to the API of the third party service provider's database 28 using the account login information submitted by a user 12. Many secured third party service providers allow other developers of systems, like the example system 10 in FIG. 1, to call out to the third-party's web-based platforms 28 in order to provide the system 10 with personal information 30 associated with a user 12, when a user 12 authorizes the system 10 to do so, for example, by providing the system 10 with a user's 12 login information to a secured third party service provider account 26. The secured third party service provider database 28 sends back personal information 30 associated with a user 12 and the system 10 receives this personal information 30 through the system's acquisition system 32.

Thus, the automatic document generating system 10 includes, in the example of FIG. 1, an acquisition system 32 that is operable to acquire information from event information databases 34 and agency information databases 36, (, the agency information 40 and the event information 42).

For example, the acquisition system 32 may be operable to download files from servers, download e-mail attachments, perform screen scraping (e.g., parsing Hyper-Text Transfer Protocol (HTML) code in web pages to mine desired patterns of content), employ the use of Optical Character Recognition "OCR" 38, or otherwise obtain personal information 30 or event information 42 associated with a user 12. For example, a software agent may be used to monitor event information 42 associated with a user 12, or another individual, and/or periodically download desired or pre-identified types of information therefrom. The system 10 may be configured to include Optical Character Recognition ("OCR") technology 38 in the acquisition system 32 to identify and digitize information that may be relevant to a job or task of the system 10.

The acquisition system 32 also may obtain useful information from other sources, including sources that are internal either to the automatic document generating system 10 or to a user 12. For example, the acquisition system 32 may obtain information from the service data 44, which refers generally instructions for the system 10 to create a variety of, and complexity of, correlating documents 46 that the system 10 may automatically generate for a user 12 when the system 10 identifies specific event information 42, and/or personal information 30, associated with a user 12.

The acquisition system 32 also may be responsible for obtaining address or other information for assisting a user 12 in automatically generating documents 46. For example, the acquisition system 32 may identify relevant information in the personal information 30 associated with a user 12 that was collected from secured third party service provider databases 28 (e.g., LinkedIn, Facebook, or Westlaw, Wolfram Alpha, etc.).

In another example, the acquisition system 32 may obtain address information 830 from agency information 40 for use in the formatting of a correlating document 46, and/or delivering the document 46 to the proper location, and/or when the address of an agency 830 should be included in a correlating document 46 (e.g., the petition for expunction FIG. 12 example below includes agency contact information 122).

In other implementations, the acquisition system 32 may use an identification of a user 12 derived from personal information 30 received from secured third party service provider database(s) 28 and/or an event record 62, and/or may use known techniques for obtaining address or other contact information for a user 12 (e.g., on-line phone books or background check services). In the latter case, the automatic document generating system 10 may not be able to ascertain an identity or contact information for a user 12 with any certainty, and ultimately may send information not only to a user 12, but also to other users 10 determined by the acquisition system 32 (e.g., users with a same or similar name as a user 12).

Information associated with an instruction, operation, and/or result(s) of the acquisition system 32 may be provided in, or in conjunction with, job data 48. That is, the term job in this context may refer to an internal device or storage scheme for managing and tracking requirements of a user 12 (e.g., with respect to generating a particular document 46 or for correlating information associated with a document). For example, a user 12 may be interested in generating a unique document 46 that contains information about a particular event. That is, the document 46 may include a document 46 that may also indicate desired types of event-related agency information 40, personal information 30, and/or event information 42 that is desired by a user 12, or the recipient of a user's 12 document 46, and presented in a particular format, or for a particular purpose, (e.g., in order to comply with statutes and/or court rules found in agency information).

For example, the job data 48 may specify a type of the agency information 40 that is desired, and/or event information 42 that is relevant in determining whether a correlating document 46 is available for a user 12. Of course, it should be understood that the term job or job data 48 is intended to represent one or more jobs or job data 48, so that a system 10 generating a document 46 may contain a plurality of jobs, where each such job or job data 48 is associated with one or more of the correlating documents 46 being generated by the system 10.

For example, the job data 48 may include, or be associated with, a first table of one or more relational databases that stores the personal information 30 associated with a user 12, a second table that stores event information 42 acquired by the acquisition system 32 from the event information 42 associated with a user 12 in response to requirements of a specific job of the job data 48, and a third table that stored event-related agency information 40 (316) acquired from the agency information 40, also in response to a job of the job data 48. That is, the acquisition system 32 may be responsible for obtaining relatively large sets of information from the agency information 40 and/or the event information 42. Individual units of the event-related agency information 40 may be related to each of a plurality of events/users 12, while user 12 events may each be related to different units of the event-related agency information 40. Therefore, it may be unnecessarily duplicative to store discrete datasets in which an event record 62 is associated with its corresponding event-related agency information 40, and, instead, as just described, the information may be stored in separate tables and aggregated when needed or desired by the automatic document generating system 10 for generating documents 46 for the user 12, and/or the lawyer or law firm for the benefit of the user 12.

For example, a notification system 58 may be used to provide specific information as described herein to the user 12. In the implementation of FIG. 1, the notification system 58 may determine an identity and/or contact information for the user 12, (i.e., for all users 12 involved who have created a user 12 profile and/or a user 12 chooses (324) a document after to logging in through a secured third party provider). The notification system 58 may then send a notification 52 to the user 12, (342) (e.g., by e-mail, and/or in a text message or phone call). Once a user 12 creates a profile or accesses the system 10 through a secured third party service provider login 26 and requests to receive notifications 52, the notification 52 may, for example, identify that a lawsuit was filed against the user 12, or against a client of the user 12, and provide options for a user 12 to learn more about the charges and other parties to the lawsuit. In one envisioned embodiment, the notification 52 would arrive as an e-mail or text message to the user's 12 mobile device 18 or computer 16 connected to a network 20 in the form 60 of an easy to read case summary 216 that may include a respond button 214. A user 12 may also choose to press the respond button 214 to immediately and the system 10 automatically begins generating a document 46 that responds to the charges. The system 10 queries event information databases 34 for any new court filings (340) in that match the personal information 30 associated with the user 12, and then automatically send a user 12 a notification 52. The case summary is accomplished by identifying the type of filing that is entered against a user 12 and then identifying the content of the document(s) 46 filed against the user 12, possibly using OCR 38 or some other method, to determine the contents of the information in a document(s) 46. The system 10 will then source the event-related agency information 40 needed to respond to the charges and select a form 60 from the forms 60 database that correlates to the event information 42 and/or event-related agency information 40 contained (338) in the charges or suit filed. The system 10 will automatically generate the document(s) 46 to include the information associated with the charges or suit filed against a user 12 (or user's 12 client), including the plaintiff(s), court name, and any procedural requirements associated with a document 46 of this type. The system 10 will query a user 12 to select from a list of options to populate on any remaining fields (326) on the document 46 that require the user's 12 input and/or selections (330) and that were not automatically populated by the system 10. A user 12 can make any further changes to the document(s) 46 and/or send the document(s) 46 directly from their mobile device 18 to the court through e-file 50 or send the document(s) 46 as an e-mail to another person, including a lawyer or law firm. The system 10 may also provide a user 12 with suggestions or options on how to respond based on the most common documents 46 filed by other similarly situated individuals or lawyers responding to similar charges and the effectiveness of the document(s) 46 utilized by these individuals in realizing a successful outcome with the response. The system 10 may provide a user 12 with statistics on the success rate of other individuals who faced similar charges in the same or a different jurisdiction by querying event information databases 34 for the event records 62 associated with individuals facing similar charges, and then identifying the correlating document(s) 46 that were generated by those other individuals to respond to the event records 62. The system 10 will analyze event records 62 to identify when a suit is filed against a user 12 and/or client of the user 12, and then send a notification 52 that includes the event information 42 associated with a user 12 or the user's 12 client.

The system 10 may also be configured for a user 12 to monitor legal activity or litigation against a user 12 and/or third-party of interest. The notification(s) 52 based on event records 62 provides a user 12 with a variety of services that are, designed to increase the efficiency and awareness of a user 12 when generating documents 46 or identifying event records 62 associated with a user 12 or another individual.

The system 10 may be configured to provide reminders of filing deadlines for current law suits by correlating event records 62 associated with a user 12 (e.g. civil court filings) with event-related agency information 40 (e.g. Rules of Civil Procedure), to provide notifications 52 to the user 12 of approaching deadlines to a correlating document 46 that may and/or must be filed by a user 12. Notifications 52 may include, for example, suggestions of strategies and filings to consider based on the event records 62 associated with other individuals who faced the same or similar type lawsuit, in the same or a different court as the user 12. The system 10 correlates the event records 62 associated with a user 12 with the event-related agency information 40 to provide reminders of filing deadlines and to provide analysis of documents 46 or actions that other individuals selected in response to law suits with similar charges.

Civil case filings are examples of event information 42 that can sourced by the system 10, in the manner described above, to identify event information 42 associated with a user 12 in order to provide a user 12 with the ability to respond to charges immediately by automatically generating documents 46 and/or forwarding notifications 52 from the system 10 directly to the user's 12 lawyer, in addition to other services provided by the system 10 for managing and/or responding to event records 62 associated with the user 12.

One example of a notification 52 from the system 10 to a user 12 is provided below in FIG. 2C, but, generally speaking, it should be understood that many types of notifications 52 could be implemented. For example, in one implementation, the notification 52 may merely identify the filing of a lawsuit against a user 12, without providing the entire text of the event record 62 (e.g. case filing). In other implementations, the notification 52 may include a notification 52 to a user 12 about an error the system 10 identified in the drafting of a document 46. For example, the system 10 can determine where the proper venue for a case filing or law suit should be by correlating the event information 42 with the event-related agency information 40 (e.g. by identifying the parties and subject matter of a particular law suit or document 46 and correlating this information to a particular field on a form 60 that is used by the system 10 to generate a correlating document). The system 10 may be configured to query event information databases 34 to determine if the court where suit was filed has personal jurisdiction over the parties in the subject matter suit and whether the suit is the type to allow the court to exercise subject matter jurisdiction over the case by correlating event information 42 contained in a particular field on a form 60 with event-related agency information 40. In this respect, the system 10 may provide a user 12 with a defense to the litigation against a user 12 if the system 10 identifies a flaw in the lawsuit based on a procedural error entered by the other party (e.g. by filing a case in the wrong court or not having personal jurisdiction over a defendant).

For example, if a user 12 is seeking to become the Plaintiff in a case and is beginning to draft relevant documents 46, such as a petition, the system 10 will verify names of parties that are followed by LLC or Inc., etc., that are contained within a particular field on the form 60 that requests this type of information (e.g., a field on a form 60 that contains the name of the other party) to determine if a user 12 correctly spelled the name of the company or corporation and whether the type of business entity is properly identified, based on corporate and other company filings (also considered event information 42) 110, including the entity's filings with the state or federal government. For example, a user 12 may utilize the system 10 to generate documents 46 such as a legal petition and accompanying documents 46, for filing a lawsuit against a trucking company, Jameson's Trucking of Tulsa, Okla. Once a user 12 enters the name of "Jameson's Trucking" in the appropriate field for the defendant's name, and "Tulsa, Okla." in the field on a form 60 that requests the defendant's residence, the system 10 will query event information databases 34 to determine if Jameson's Trucking is a registered entity in Oklahoma, and if so, what type of entity. If the name is incorrectly spelled or the entity is incorrect (e.g. should be an LLC not a LLP), the system 10 will send a notification 52 to a user 12 identifying the error and/or automatically correct the error for the user 12. The system 10 may also perform a search of event information databases 34 to determine where a party to the suit is domiciled, if the party is suspected to be a resident of another state, and assist a user 12 in determining where venue is proper by correlating the event information 42 associated with the party with event-related agency information 40. The system 10 may also be configured to, for example, automatically populate other fields on a form 60 that correlate to the event information 42 entered in another field on the form 60. For example, the system 10 may populate a field on a form 60 that requests the registered agent and principle place of business for a defendant that was entered earlier by the user 12 in response to a query by the system 10 to enter the defendant's name. This feature may also assist a user 12 with determining where to send a document 46 (e.g., in order to provide proper notice to the relevant parties to a document 46 or law suit).

If the system 10 identifies that a defendant is not an entity, but rather, an individual, the system 10 may be configured to perform a query of event information databases 34 for names that match the individual defendant's name to determine if any event information 42 associated with the defendant within the jurisdiction named in a form 60 to determine if the defendant's relationship with a jurisdiction may be sufficient to allow the court to exercise personal jurisdiction. Once the parties are identified, the system 10 may then automatically populate other fields on the form 60 that correlate to the event information 42 associated with the identified parties. In another example described below, the embodiment presented in the example below determines the proper jurisdiction for filing a Petition for expunction FIG. 12 of event information 42 associated with a user 12 based on where the events occurred in the event information 42 associated with a user 12, and correlating event-related agency information 40 that identify the proper jurisdiction for filing the petition for expunction FIG. 12 based on the particular event information 42 associated with a user 12.

The notification 52 may include suggestions on documents 46 or filings to consider based on the correlating documents 46 identified (322) as being associated with the event information 42 and/or agency information 40 associated with the user 12. The system 10 may also suggest documents 46 that were selected by other individuals who responded to similar documents 46 or filings, according to event information 42, including event records 62 such as court filings. The system 10 may also call out to third party service providers to receive other information associated with a user 12 in order to suggest other documents 46 that are associated with issues identified in the event information 42 and that correlate with documents 46 and/or event-related agency information 40. The system 10 may then suggest the automatic generation of documents 46 that are beneficial to a user 12 based on the system's 10 analysis of the information associated with the user 12, the event, and/or the document 46 suggested by the system 10 and/or sought to be generated by the user 12. A user 12 may respond to the legal filing or suit, and/or begin the drafting of a response, by selecting from a list of documents 46 available and/or suggested by the system 10 that are already populated with the relevant event information 42 associated with the user 12. The names of the parties as well as the court name and the charges may be identified and sourced from the event information databases 34 and formatted into data fields 616 to correlate with a numbered field 1110 on the form(s) 60 used by the system 10 in automatically generating the correlating documents 46. A user 12 may now spend more time handling other aspects of their professions, such as courtroom strategy, by saving time during the generating of documents 46 and identifying needless errors in a document. In FIG. 1, then, the event information databases 34 that host civil court filings are illustrated as providing the event information 42 to the system 10, which may be accomplished, for example, by calling out to the event information databases 34 using a secure connection and formatting the event information 42 associated with a user 12 in order to transmit a notification 52 to the user's 12 mobile device 18 by way of a text message or e-mail that includes a case summary. FIG. 2C illustrates an example of a notification 52 that includes a case summary for a civil suit associate with a user 12. A user 12 also has the option to "respond" by automatically generating the relevant documents 46 associated with the event.

Then, a correlating document, also referred to as a legal document, may be generated by the system 10 for the user 12, for any of the above purposes or by using any of the techniques described herein, or other techniques. The document 46 (an example of which is illustrated in FIG. 12) may thus include specific event information 42 associated with a user 12 and event-related agency information 40 that may be of particular use and interest to the user 12.

In this way, a user 12 may directly and/or indirectly benefit from the documents 46 that are of particular use and value to the user 12. For example, a user 12 may be an attorney who may now be able to provide a reduced cost service to an individual who otherwise may not have been able to afford the attorney's services due to the relatively high cost the attorney would otherwise have charged for generating the relevant documents 46. Additionally, or alternatively, the document 46 generating system 10 provides a user 12 with an opportunity to provide yet further value through reduced costs and increased efficiency in generating documents 46 for the user 12.

By identifying event information 42 or agency information 40 that correlates to fields on a form 60 used to generate document(s) 46, the system 10 may source relevant information, identify documents 46 that may be generated with the information, and generate the document 46 automatically by matching the information to fields within the document 46 and/or to identify which document 46 correlates to the information. For example, the system 10 uses data from the user's 12 arrest records and/or case disposition records to determine if a user 12 meets the statutory requirements for filing a petition for expunction FIG. 12 of event information 42. Once the system 10 determines whether or not the user's 12 event information 42 meets the statutory requirements for filing a petition for expunction FIG. 12, the system 10 uses the public records information, including the event information 42 and the event-related agency information 40 to populate the document 46 based on the specifications for filing a petition for expunction FIG. 12, as defined in the event-related agency information 40 records. Once the system 10 identifies that a user 12 meets the statutory requirements for filing a petition for expunction FIG. 12, the system 10 generates the documents 46 to be filed, the petition and order for expunction, among other correlating documents 46. The system 10 can use the public records information to populate the relevant information on the form 60 by correlating the public record information with the particular field on the form 60 that include the information, and formatting the information into the format of the form 60 and populating the particular fields (328). For any fields on the form 60 that remain unpopulated, the system 10 will query a user 12 to populate the particular fields that remain. The system 10 may also provide the user 12 with options for populating the remaining unpopulated fields based on event information 42 or agency information 40 that correlates with a particular field, even if the particular information used to generate the options is not directly associated with the user 12.

The document 46 generating system 10 initially determines a job description. For example, the document 46 generating system 10 may receive a request from the lawyer or law firm for a desired job, where the request may contain event-related information, or address a certain legal issue or parameter that is a focus of services being offered to a current client. For example, where the lawyer or law firm is a criminal defense attorney, the job description may utilize sections of the criminal code in which the lawyer or law firm finds helpful in providing services to the client.

The job description may specify a type or characteristic of desired agency information 40, as well as a type or characteristic of desired event information 42. In this regard, it should be understood that desired agency information 40 and event information 42 may be specified or described within the job description in the same, different, or overlapping manner(s), for example, according to a preference of a user 12 or based on an operation of the document 46 generating system 10, or based on a format or storage/transmission protocol associated with the agency information 40 and the event information 42.

For example, the job description may specify either the desired agency information 40 and/or the desired event information 42 with respect to one or more of a statue, an ordinance, a law, a code section, a regulation, a rule, a municipality, a violation, a geographical region, or a judgment. For instance, a user 12 may draft a document, a legal document, correlating with agency information 40 related to a particular municipality that may have implemented an ordinance prohibiting certain actions that are particular to the municipality. In such cases, a user 12 may not be aware of penalties associated with violating the local ordinance or with the municipality's specific requirements for drafting a particular legal document, so that the error notification 52 may be useful to a user 12 in identifying and/or correcting a drafting error that could result from not knowing the particular ordinance. The system 10 may accomplish this by querying event information 42 and agency information 40 databases to determine whether a user's 12 entry for a particular field or position of the form 160 used to generate the documents 46 complies with the correlating agency information 40 for the municipality, including event-related agency information 40, with the user's 12 entry for a particular field on a form.

The event information 42 may be queried according to a type of criminal offense or legal issue described therein, such as a type of criminal or civil suit, and/or based on a geographical region (e.g., whether a user 12 is drafting a legal document 46 for a jurisdiction in-state or out-of-state). The event information 42 also may be searched based on a period of time of occurrence of the event(s), so that, for example, the job description may request all of a certain type of event (e.g., arrests for a certain crime) that occurred in the last week or month.

The event information 42 and the agency information 40 may be determined according to a common parameter, including, for example, any of the parameters just listed. That is, for example, the job description may specify a particular regulation that is included in the agency information 40 and that is included in one or more events of the event information 42.

In some implementations, the document 46 generating system 10 may be wholly or partially unique to the public records information. For example, as referenced above, the agency information 40 and the event information 42 may have different formats, locations, and interfaces than one another, and than other sets of agency/event information 42. As a result, it may be advantageous to configure the automatic document 46 generating system 10 to a particular type of agency/event information 42, prior to deployment for use by the user 12. For example, one implementation of the document 46 generating system 10 may be used in conjunction with Texas Criminal and/or Civil Code information, Illinois Criminal and/or Civil Code information, New York Criminal and/or Civil Code information, or the California Criminal and/or Civil Code information. In this way, components of the document 46 generating system 10 may be optimized for interactions with particular types or instances of the public records information.

In some implementations, the job description may merely specify desired event information 42, and the acquisition system 32 may include a rule engine for determining the types of agency information 40 that may be required, based on the event information 42. In other implementations, the agency information 40 may be downloaded virtually in whole for local storage/access (especially when relatively small in size; the downloaded agency information 40 may then later be queried based on specific event information 42 and/or the personal information 30). In still other implementations, the desired agency information 40 may be specified with more precision or detail, to minimize the difficulty of later queries processed against the specified agency information 40.

Based on the job description, agency information 40 may be determined and/or event information 42 may be determined. For example, desired types and/or instances of event information 42 may be downloaded from the event information 42 of the public records information, using information from the job description, such as just described. Similarly, data from the agency information 40 may be obtained in a manner specified by or for the user 12. In various implementations, either the desired agency information 40 or the desired event information 42 may be determined first, or, in other implementations agency information 40 and event information 42 may be determined at the same or overlapping times.

In FIG. 5, the single event record 62 is illustrated, although of course multiple events (records) may be obtained, so that, more generally, it may be seen that in some implementations, various combinations of events, circumstances, and/or incidents may be identified and responded to with valuable and/or relevant documents 46. For example, a first event may be associated with a recent violation of a law by the user 12, while a second event may be associated with a violation of a deferred disposition agreement associated with another criminal offense. In this way, for example, event-related agency information 40 that is obtained and correlated with the event information 42 may be based on, or may include, information that takes into account such a combination. For example, such pluralities of offenses may carry the potential of different or stiffer penalties than each one alone. In another embodiment, a prosecutor may use the system 10 to automatically generate legal documents 46 associated with prosecuting a defendant being charged with a crime by sourcing the event information 42 associated with the defendant, including an information, indictment, and/or arrest records information contained in event information databases 34. In addition to automating the documents 46 for the prosecutor, the document 46 generation system 10 may be configured to consider event information 42 associated with the defendant (e.g., the defendant's criminal history)

when generating documents 46, in order to properly charge the defendant with the more severe crime. For example, the document 46 generating system 10 may be configured to identify the past offenses in event information databases 34 and automate the form 60 to reflect the charge's increase in severity. A prosecutor who is prosecuting a defendant who resides in another jurisdiction may not be aware of the other charges and would thus not be able to consider this event information 42 associated with the defendant when drafting relevant legal documents 46 to be used for the purpose of prosecuting the defendant.

Service data 44 may be determined, based on the determined (event-related) agency information 40 and/or the determined event information 42. For example, as described above, the acquisition system 32 may access the service data 44, in order to supplement the event information 42 with personal information 30 associated with the user 12. In this way, particular attributes, evidence, or information associated with a user 12 (e.g., arrest records, case disposition records, social security number, arrest date, property interests) may ultimately be included in the document(s) 46.

At this point, in some implementations, a determined event record 62 may be correlated with corresponding event-related agency information 40. For example, the notification system 58 may select or determine an event, and may then query a database in which the acquired agency information 40 is stored. For example, the event record 62 may include a filing for a marriage certificate by the user 12, where a query against agency information 40 downloaded from the agency information 40 and based on such an event may auto-populate a divorce document 46 using the event-related information that correlates with the agency information 40. A user 12 would be queried to complete the remaining portions of the document 46 without having to populate fields on the form 60 that contain event information 42 available in event information databases 34. The document 46 could be made readily available for a user 12 upon request or login to the system 10.

Then, a document 46 (e.g. For filing a divorce) may be generated. For example, the correlated event and event-related agency information 40 (and potentially the service data 44) may be included within a form 60 that provides for the filing of a divorce, and that is drafted specifically for the user 12. As referenced above, the information included in the personalized form 60 may be (re-) formatted or otherwise cleaned or improved in appearance, either during the generation of the document, or earlier in the process.

A personal notification 52 may be provided. For example, and as already described, the personalized notification 52 may be sent by mail or e-mail, or may be provided over a mobile device 18.

In other implementations, and as described with respect to some of the examples of FIG. 1, a document 46 may be automatically generated after the system 10 identifies a user 12 and correlates event records 62 associated with a user 12 with the event-related agency information 40. In cases where a valuable document 46 is generated for the user 12, a letter, e-mail, or voicemail may be generated that includes basic or general information about the document(s) 46 and/or the benefits or purpose of the document(s) 46. In such cases, little or no information determined based on the job description (e.g., event information 42, event-related agency information 40, and/or service data 44) need not be included until a user 12 purchases or requests the document, although, in some implementations, a general reference to such document(s) 46, or to an availability of such document(s) 46, may be included in the notification 52.

By receiving the notification 52, a user 12 is informed of the existence and availability of personalized documents 46, and is provided with a technique for obtaining the personalized documents 46. For example, the notification 52 may include an address, e-mail address, website address, or phone number that a user 12 may use to, for example, download or access, a particular document 46 or obtain instructions on how to do so, (i.e., by providing the user 12 with access to the legal document 46 generating system 10).

FIG. 13 is a flowchart 1300 illustrating an alternative implementation of the system 10 of FIG. 1. In the example of FIG. 13, as described with respect to FIG. 1, (1310) a user is first authenticated from a secured third party login 26, (1312) a job description is determined, (1314) agency information 40 is determined, (1316) event information 42 is determined, (1318) then an inferred event may be determined or obtained by the acquisition system 32 from the event information 42, based on the job description. For example, the job description may request for all or some of that information from event information databases 34, so that the acquisition system 32 may query the event information 42 based on such information to obtain the event information 42 as a subset of the event information 42 (e.g., by querying the event information 42 for all arrests or criminal charges associated with the user 12, as specified in the user's 12 personal information 30 received from the secured third party service provider databases 28. In the example of FIG. 1, as described with respect to FIG. 13, a job description is determined, agency information 40 is determined, and/or event information 42 is determined. Then, an inferred event is determined, based at least on the event information 42. The inferred event is (1320) correlated with event-related agency information 40, (1322) then the inferred event and or event-related agency information 40 is correlated with a document 46. The system 10 then (1324) selects a form and generates a correlating document 46 and/or notifications 52 by correlating the information with the correlating fields 1110 on a form 60 in order to populate the form 60 and generate a document 46.

For example, as referenced above, an event may include a judgment against a user 12 by a Court, or by any other governmental agency. If such a judgment is very large, or if the event information 42 includes a default on the judgment by the user 12, then an inferred event, e.g., a current or future bankruptcy of the user 12, may be determined and the correlating documents 46 may be generated using the public record information to begin the automation of the documents 46.

For example, the acquisition system 32 and/or the notification system 58 may be configured to implement a rule engine that executes inference rules based on the event information 42. For example, a rule may be implemented that states that when a damages amount may be too excessive to file in a particular Court based on the event-related agency information 40, (e.g., $100,000, or $5,000,000 limits on damages that may be sought) may trigger an inference of the inferred event (e.g., the Court or venue is not proper). Many other examples of such rules and inferences may be implemented. For example, the lawyer or law firm may be interested in generating documents 46 for creating a trust account. The acquisition system 32 can source public record information associated with users 12 named in a legal document 46 being generated to determine if a user 12 is associated with event information 42 that may disqualify a user 12 from being a trustee (e.g., a user 12 is a minor or is convicted of a felony). The lawyer or law firm can configure the notification system 58 to send a notification 52 to a user 12 if a user 12 types in a value in a numbered field 1110 on a form 60 that correlates with agency information 40.

Accordingly, the inferred event may be correlated with event-related agency information 40. For example, in the examples just given, the inferred event of bankruptcy may be correlated with event-related agency information 40 associated with relevant bankruptcy laws. Or, the inferred event of a filed lawsuit or right to file expunction may be correlated with event-related agency information 40 associated with agency information 40 required to file a document.

In another example of the operations of FIG. 1, it may be the case that the event includes a filing for a business license by the user 12. Then, the inferred event may include a need for a trademark filing, or other business-related needs. Accordingly, the (inferred) event-related agency information 40 may include event-related agency information 40 regarding trademark filings or procedures, such as might be obtained from the U.S. Patent Office, and/or agency information 40 related to the business license. This information may then be used to infer the legal action to be taken and/or to generate the legal documents 46 at the request of, or as a suggestion to, the user 12. A notification 52 may be generated and sent to the user 12 and a correlating document 46 may be generated by the system 10 for a user 12.

A formatting system 74 may be used to clean or otherwise reformat data in the job data 48. For example, the formatting system 74 may appropriately title case words in the job data 48 (i.e., may re-format words in all-capital letters to use appropriately capitalized/un-capitalized letters). As another example, the formatting system 74 may check address information associated with a user 12 or any other address, such as the address of a governmental agency 830, that is listed in the document 46, e.g., to include or correct zip code information, or otherwise make ready at least some of the job data 48 for delivery to a user 12.

The public records, include "event records" 62, which may refer to any data or information that relates to an individual or group of individuals, such as, for example, a user 12. For instance, and to reiterate the examples above, the event information 42 may include governmental information, tax information, property ownership information 112, legal information (e.g., court-related or law enforcement information), corporate and other company filings 110, arrest or criminal charge records 114, and case disposition records 116, or credit reporting information 148, etc. More specifically, the public information referred to as "agency information", includes information which is generally not associated with, but is applicable to, a user 12 and/or to the document 46 generated by the system 10 for a user 12, and also may include event information 42, which includes event information 42 that is related to a unique event in which a user 12 was a participant, such as an arrest or criminal offense.

For example, agency information 40 may include information related to laws, statutes, or rules that are codified by a local, state, or national legislature or administrative agency, as well as the internal agency policies and contact information 122, including data migration policies 126, of these governmental or political agencies. Such information is therefore, as just mentioned, generally not specific to a user 12, but may be applicable or useful to a user 12 in a specific circumstance or for identifying and generating a particular correlating document 46. In contrast, the event information 42 includes an event record 62, which includes event information 42 related specifically to a user 12 or mentioning a user 12, (e.g., event information 42 that describes an event in which a user 12 was arrested for allegedly committing a criminal offense).

For example, the event record 62 may include event information 42 regarding a circumstance in which a user 12 was arrested or detained, or otherwise involved in a violation or alleged violation of the law. As another example, the event record 62 may include event information 42 regarding a circumstance in which a user 12 was arrested for a separate criminal offense, tried for the charge stemming from the arrest, and subsequently acquitted by the Court.

The event record 62 may include information regarding a filing or request provided by a user 12 to an agency or authority associated with the agency information 40. For example, a user 12 may file a request for a business license (e.g., to start a company in a municipality) or file a marriage license 118, or may file a lien or mortgage on a dwelling or other structure. A user 12 may file a complaint with a governmental agency, (e.g., against the same or a different agency, or against a separate business). A user 12 also may file a lawsuit, or may have a lawsuit filed against him or her, or may have a judgment issued for or against him or her (e.g., by a court, or by another governmental agency, such as the Department of Public Safety (DPS)).

Generally, then, the event(s) of the event information 42 may include any event in which a user 12 may have been involved, or in which a user 12 may currently be involved, or may be involved in the future. Further, as described in more detail below, the event information 42 may include at least some event records 62 to which at least some agency information 40 may apply. That is, for example, the agency information 40 may include a large number of laws, codes, statutes, or rules, while the event information 42 may include a large number of event records 62. Moreover, although illustrated in FIG. 1 (for the sake of clarity and convenience) as being included within the public records information, it should be understood that the agency information 40 and the event information 42 may be stored in separate locations (e.g., separate databases and/or separate sites on the network 20, or on different networks 20), in separate formats, and perhaps requiring different interface techniques.

Further, the agency information 40 may itself include a large number of the same or different types of agency information 40, only some of which may be related to a given (one or more of the) event records 62, where the included agency information 40, again, may be stored using different locations, formats, and/or interfaces. Similarly, but conversely, the event information 42 may include a large number of event records 62 that may be stored using different locations, formats, and/or interfaces, where only some of the event records 62 may relate to any or all of the agency information 40.

FIG. 5 illustrates that an event record 62 may include one or more incidents. For example, the event record 62 may include an individual record associated with a user 12, which is associated within the event record 62 with an incident. Generally, the incidents may refer to multiple incidents that occurred within (or related to) the context of the overall event. For example, a user 12 may be arrested for possession of a controlled substance, and, during a subsequent stop by a police officer, may be arrested for speeding and driving while intoxicated. In this example, the overall event of the detainment and arrest of a user 12 may include the three incidents of possession of a controlled substance, speeding, and driving while intoxicated. That is, each incident may refer to a subset of (a type of) the event information 42 that may be related to separate portions of the agency information 40. In the example just given, for example, each of the three incidents may be related to different laws or ordinances stored in the agency information 40, since each may occur independently of the other.

FIG. 3 is a flowchart 300 illustrating example operation of the system 10 in FIG. 1. As described in more detail below, then, the automatic document generating system 10 is operable to correlate an event (as represented in the event record 62) with a subset of the agency information 40 (i.e., event-related agency information 40) that is associated with the event. Conversely, the automatic document generating system 10 may correlate a selected subset of the agency information 40 with corresponding events of a plurality of the event records 62. The system 10 may also correlate the event record 62 associated with a user 12 and the agency information 40, including the event-related agency information 40, with a correlating document 46. The system 10 may generate a correlating document 46 that includes the personal information 30, agency information 40, including the event-related agency information 40, and/or event information 42 associated with a user 12. The document 46 will comply with and/or include the agency information 40 and event-related agency information 40.

The system 10 uses personal information 30 associated with a user 12 to identify and authenticate a user 12. The personal information 30 may also be used by the system 10 to locate event information 42 or event records 62 associated with a user 12 based on correlations with a user's 12 personal information 30. The personal information 30 is also used by the system 10 to populate documents 46 and/or identify correlating documents 46 for a user 12. This personal information 30 may include, for example, the date of birth, full name 510, sex 514, and race 516 associated with a user 12, among other information associated with a user 12 that third party service provider database(s) 28 may possess on their databases, and of value to the system 10 in generating documents.

The personal information 30 received (310) from a secured third party service provider database(s) 28 allows the system 10 to identify a user 12, without a user 12 experiencing the inconvenience of entering a user's 12 personal information 30. The system 10 benefits from safely and securely authenticating a user 12 through a secured third party service provider login 26. The system 10 receives valuable personal information 30 associated with a user 12 that the system 10 may later correlate with other information; to suggest documents 46 and that may be beneficial to a user 12.

Once the system 10 identifies a user 12, (312) the system 10 sends a search query, by, for example, calling out over a secure connection to the API of event information databases 34 searching for event records 62 and/or event information 42 associated with a user 12. Event information databases 34 are databases that collect, aggregate, and/or otherwise possess event records 62 and/or event information 42 derived from event records 62.

The event information databases 34 respond to the search query by sending to the system 10 any event information 42 associated with a user 12. If event information 42 associated with a user 12 is located on event information databases 34, the acquisition system 32 receives the event information 42 associated with a user 12 for further processing. The (314) acquisition system 32 identifies event information 42 associated with a user 12 and uses a script to reformat specific event information 42 into the format of the system database 56. Event information 42 associated with a user 12 is matched with a user's 12 personal information 30 and collectively stored on the system database 56. The system database 56 organizes event information 42 associated with a user 12, and personal information 30 associated with a user 12 in specific data fields 616 to be used by the system 10 to correlate with event-related agency information 40 and/or correlating documents 46 generated by the system 10 for a user 12.

The (316) system 10 then sends a search query, or several search queries, for example, in the same manner described above, to agency information database 36 in order to collect event-related agency information 40 related to all or some of the event records 62 and/or event information 42 associated with a user 12. The system 10 receives event-related agency information 40 from agency information databases 36 through the acquisition system 32 illustrated in FIG. 1. The event-related agency information 40 is formatted by the acquisition system 32 in a similar, or different, manner as that described above with respect to the event information 42 associated with a user 12.

The (318) system 10 then determines combinations of events, circumstances, and/or events. If the system 10 identifies a (320) correlation between event information 42 and event-related agency information 40, the system 10 determines if a (322) correlating document 46 is also available. A correlating document 46 is a document 46 that correlates to and/or includes as content within the document 46: an event, event record 62, event information 42, and/or event-related agency information 40 associated with a user 12. A correlating document 46 may, in effect, respond to event record(s) 62 or event information 42 and/or otherwise provide a benefit or value to a user 12. The correlating document 46 may also provide a user 12 with a remedy and/or avenue of relief based on event information 42 and/or agency information 40, including event-related agency information 40, associated with a user 12.

A user 12 may not be aware of the necessity or the availability of a particular correlating document 46 available to a user 12. Even if a user 12 was aware of the existence of a correlating document 46, a user 12 may not have access to the information necessary to determine whether or not a user 12 stands to benefit from a particular correlating document 46, or from the effect of a correlating document 46. Even if a user 12 fully appreciates the benefits of a correlating document 46, a user 12 may not be aware of where to locate, and/or how to properly complete a template of the correlating document 46 or, even more tasking, how to begin drafting the particular correlating document 46 from scratch. A user's 12 only alternative to performing the research, making the correlations, and properly drafting the documents 46 was to hire an agent, such as a lawyer or a law firm, to perform these tasks and generate a correlating document 46 for a user 12. The system 10 performs these tasks automatically by correlating personal information 30 associated with a user 12 with event information 42, and event-related agency information 40, to determine if a correlating document 46 is available for a user 12. The system 10 then automatically generates a correlating document 46 for a user 12. A user 12 may also utilize the system 10 to perform (336) follow-up search queries to event information databases 34 to provide the user 12 with monitoring and analysis of event information A user 12 may (324) select a correlating document 46 for the system 10 to automatically generate, if the system 10, for example, fails to identify a correlating document 46 for a user 12, or for any other reason. The phrase "effect of the correlating document" refers to, for example, value, benefits, and/or opportunities available to a user 12, that include and/or as a result of a correlating document 46. For example, a document 46, such as a petition for expunction FIG. 12, offers little utility to a user 12 if the petition for expunction FIG. 12 is not subsequently filed in the appropriate court or if a user 12 does not meet the statutory requirements for filing a petition for expunction FIG. 12. Thus, a correlating document's 46 benefits are in the document's 46 effect, when executed properly, not just the document's 46 existence. The system 10 may also be configured to provide electronic filing options 50 and/or provide a user 12 with instructions on how to file a particular document 46 manually in order to realize the effect of a document 46.

For example, the system 10 may locate event record(s) 62 and/or event information 42 associated with a user 12 (e.g., such as an arrest record 114 alleging that a user 12 committed a criminal offense). The system 10 may then locate another event record 62 or additional event information 42 associated with a user 12, or event information 42 associated with the same, or a different, event associated with a user 12 (e.g., such as a case disposition record 116 acquitting a user 12 of the criminal charge(s) documented in the first arrest record 114.)

The system 10 then correlates event-related agency information 40 with event information 42 found in the arrest record 114 and/or case disposition record 116 that suggests a beneficial correlating document 46 may be available to a user 12 (e.g. A statute that indicates an individual may direct the court to destroy or otherwise limit disclosure of an arrest record 114 if an individual is later acquitted of the charge). The system 10 then determines if a user 12 may benefit from a correlating document 46 (e.g. whether the event information 42 associated with a user 12 meets the requirements in a statute). If the system 10 determines that a correlation exists that may be beneficial to a user 12, the system 10 sends a notification 52 to a user 12 alerting a user 12 of the availability of the correlating document 46 and/or automatically generates a correlating document 46 for a user 12 (e.g., such as a Petition for expunction FIG. 12, Notice of Non-Disclosure, or other petition or document 46 that allows an individual to direct the court to destroy or limit disclosure of public records information).

A user 12, in this example, may not have been aware of the availability or utility of the correlating document 46. The correlating document 46 provides a user 12 with a mechanism to effect the removal of an arrest record 114 associated with a user 12. Individuals who are arrested and/or charged with a crime, and do not receive a final conviction, may mistakenly believe that the arrest record 114 is no longer visible to the public, because the arrest did not result in a final conviction.

Arrest records 114 and case disposition records 116 are often separate records that exist independently, possibly also residing on separate event information databases 34. Although a user 12 did not receive a final conviction, the arrest record 114 remains as a blemish on a user's background. The event records 62 associated with a user's 12 arrest may be misleading to an individual, such as an employer or future employer, who may discover an arrest record 114 associated with a user 12, but not a case disposition record 116 acquitting a user 12 of the criminal offense. The individual may assume that a user 12 actually committed an offense, and/or mischaracterize a user 12 as a criminal. By generating and filing a petition for expunction FIG. 12, a user 12 may seek to avoid detrimental consequences of having an arrest record 114 visible to the public, especially if a user 12 was acquitted or otherwise not convicted of a criminal offense alleged in an arrest record 114. Thus, the system 10 provides a user 12 with a process to manage a user's 12 reputation by limiting disclosure of event information 42 associated with a user 12.

Once the system 10 identifies a correlating document 46, the system 10 generates a correlating document 46 by populating fields on a document 46 template, referred to hereafter as a form 60, specifically designed to correlate with personal information 30, and event-related agency information 40, and event information 42 associated with a user 12. The form 60 or form(s) 60 are stored in a forms database(s) 58. A forms database 58, like the examples illustrated in FIG. 1A and FIG. 1C may consist of a near infinite variety of forms 60, or category of forms 60, that may be generated for variety of different users 12 and for a variety of purposes. Examples of such forms illustrated in FIG. 1C include Trust templates 130, Wills Templates 132, Non-Disclosure Templates 136, Entity Formation and Agency law forms 138, and any other document forms 134. Once the system 10 populates the fields on a form 60, the system 10 completes generating a document 46 and makes the document 46 available for purchase by a user 12, for example, in a shopping cart 54 connected to the system 10. A user 12 may then download, print 68, and/or send the document 46 (334) as an attachment in an electronic message.

A user 12 may also execute or file a correlating document 46 using the system 10. For example, if the correlating documents 46 include a reply to a lawsuit filed against a user 12, a user 12 may digitally file correlating documents 46 with the appropriate court clerk directly from the system 10. The system 10 in FIG. 1 is configured to include, as an example, the e-file system 50 that digitally transmits, through secure connection, documents 46 directly to a court clerk or other agency. The system 10 may be configured to allow the user 12 to electronically transmit documents 46 to any agency or individual offering digital document 46 filing as an option for individuals.

The system 10 will also provide a user 12, or a user's 12 agent, with a means of which to receive notifications 52 from the system 10 when event information 42 associated with a user 12 becomes available and/or correlating documents 46 become available for a user 12. For example, the system 10 may send a notification 52 to a user 12, using the notification system 58, informing a user 12 that a newly enacted statute correlates with past event information 42 associated with a user 12 that makes available to a user 12, a correlating document 46, that may also benefit a user 12. The system 10 may also, for example, send a user 12 a notification 52 if the system 10 identifies a new arrest record 114 associated with a user 12, or if a past arrest record 114 now qualifies for the benefit of a correlating document 46 based on a correlation of the past arrest record 114 with event-related agency information 40. A notification 52 may alert a user 12 of event information 42 associated with a user 12 and correlating documents 46 the system 10 may automatically generate for a user 12.

The system 10 me be configured such that a user 12 may be better positioned to prevent or identify instances of misappropriation of a user's 12 personal information 30. For example, another individual associated with an event, may falsely claim the personal information 30 of a user 12. If an event record 62 is created with event information 42 associated with a user's 12 personal information 30, the system 10 may send a user 12 a notification 52, almost instantly, that may also include an event record 62 and/or event information 42, or other information, associated with a user 12. The system 10 may be configured to send search queries to event information databases 34 on a periodic, or continuous, basis to identify event information 42 associated with a user 12. The system 10 may then send search queries to agency information databases 36 in search of agency information 40, including event-related agency information 40, which may correlate to event information 42 associated with a user 12.

If a correlation exists between the event information 42 and the event-related agency information 40, the system 10 determines if correlating documents 46 are also available that may also benefit a user 12. If a correlating document 46 is available, the system 10 may provide a user 12 with a correlating document 46 as an option, possibly among several other options of correlating documents 46 available to a user 12. A user 12 may select a correlating document 46 from the available correlating documents 46 according to the purpose, or benefit sought, of generating a particular correlating document 46 for a user 12. If, for example, a notification 52 of an event record 62 associated with a user 12 is a suspected instance of identity theft, a user 12 may login to the system 10 and learn more about the event information 42 associated with the notification 52. A user 12 may select a correlating document 46 that informs 60 the system 10 that a user 12 suspects an event record 62 is an instance of identity theft. The system 10 may then automatically generate correlating documents 46 for a user 12 that assist a user 12 in reporting the identity theft and correcting the event record 62 to remove a user's 12 personal information 30. The system 10 may automatically generate correlating documents 46 required for filing a lawsuit against an individual who misappropriated personal information 30 associated with a user 12. A user 12 may file the correlating documents 46 with the court clerk through e-file 50.

In one embodiment, the system 10 may perform a variety of tasks or jobs. An example of one of these jobs or tasks, demonstrated in this description, is identifying a user 12 upon login, and automatically generating a petition for expunction FIG. 12 for a user 12. The system 10 searches for arrest and or criminal offense information associated with a user 12, determines whether a correlation exists with the event-related agency information 40 and a correlating document 46 that may benefit a user 12, and automatically generates the correlating documents 46 for a user 12 using a variety of information from a variety of sources explained in more detail below.

Figure 4:
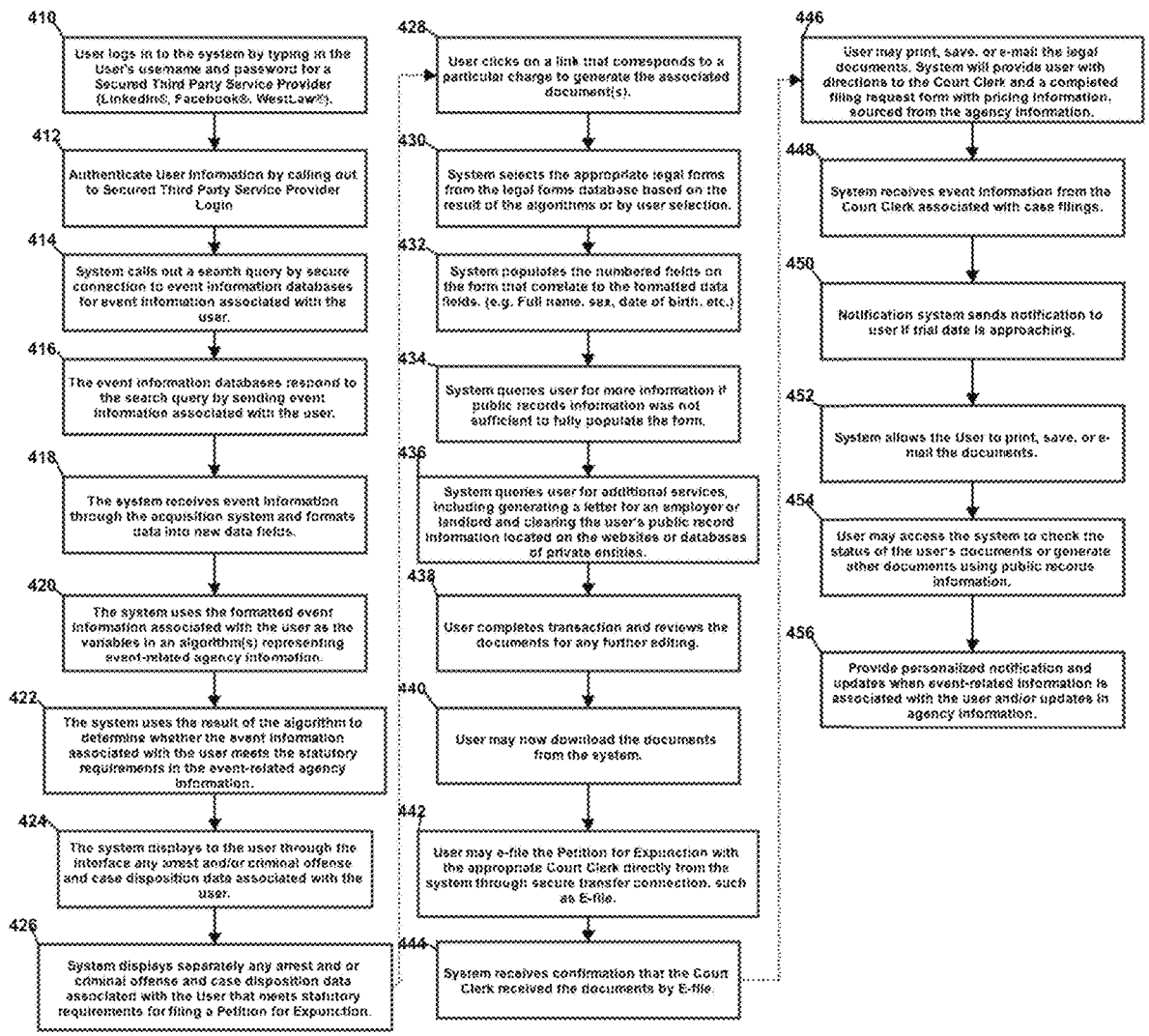
FIG. 4 is a flowchart of a system process for generating a petition for expunction.
Figure 11D:
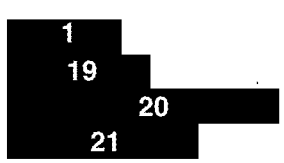

FIG. 4 is a flowchart 400 illustrating example operation of the system 10 in FIG. 1. In the example of FIG. 4, the system 10 may automatically generate correlating documents, (e.g. a petition for expunction FIG. 12) for a user 12, in some cases, without the need for a user 12 to enter any personal information 30 after logging in to the system 10. In this example embodiment, a user 12 may login to a system 10, like the example system 10 in FIG. 1, through a secured third party service provider login 28, or using a traditional sap system login 24 described above.

Once a user 12 is logged in and authenticated by the system 10, the system 10 determines if event information 42 associated with a user 12 is available that correlates with event-related agency information 40 (e.g., in this embodiment, Chapter 55 of the Texas Criminal Code 124 information), and determines whether a correlating document 46 is available that may benefit a user 12 (e.g., a petition for expunction FIG. 12 of public records associated with a user's 12 arrest record 114).

If the system 10 identifies correlating documents 46 for a user 12, the system 10 automatically generates correlating documents 46 for a user 12. A user 12 logs in to the system 10, and if correlating documents 46 that may be beneficial to a user 12 are available, a user 12 may select for the system 10 to automatically generate correlating documents 46. A user 12 may, for example, be presented with an option to purchase the complete, or partially complete, petition for expunction FIG. 12, and other correlating documents 46, and/or other additional services 64 (e.g., Order for Expunction, Letter to an Employer, Sending Notice to all Private Entities of an Order of Expunction, etc.) directly from the system's 10 shopping cart 54.

The system 10 may be accessed on a mobile device 18 or a computer 16 (or laptop), as well as other devices, such as an iPad or Kindle Fire. A user 12 logs in to the system 10 by viewing the interface 22 and typing on to a keyboard 14. A user 12 must enter login information (410), as described above in the description of FIG. 1. A user 12 may be authenticated through the system 10 using a secured third party service provider login 26, as described above, by having a user 12 enter a user's 12 username and password FIG. 2A, associated with an active account for a secured third party service provider 26 (LinkedIn®, Facebook®, Westlaw®).

The system 10 authenticates a user 12 after a user 12 logs in to the system 10 and (412) the system 10 receives personal information 30 associated with a user 12 from the secured third party service provider database(s) 28 (310). Once the system 10 authenticates a user 12, the system 10 sends a search query (414) to event information databases 34 for event information 42 and event records 62 associated with a user's 12 personal information 30. The event information databases 34 send back (416) event information 42 associated with a user 12, if event records 62 and/or event information 42 associated with a user's 12 personal information 30 are found on the respective database(s) (314).

If a user 12 accesses the system 10 through a secured third party service provider login 26, the system 10 calls out by secure connection to the API of the secured third party service provider's database(s) 28 using the account login information 26 provided by a user 12. The secured third party service provider database 28 sends to the system 10 personal information 30 associated with a user 12. The system 10 receives the personal information 30 through the acquisition system 32.

The system 10 formats the personal information 30 in the acquisition system 32 and places formatted personal information 30 associated with a user 12 into the corresponding data fields 616 on the system database 56, based on the value or type of information collected (e.g. the source, subject, meaning, or content of the information, etc.). For example, an arrest data would be entered by the system 10 into the data field 616 that correlates with an arrest date.

Figure 2A:
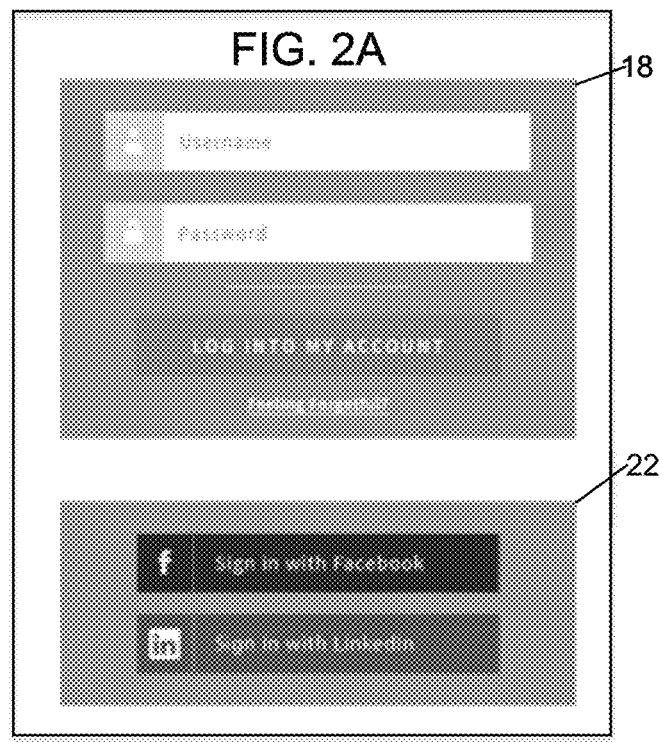
FIG. 2A illustrates an example of a screenshot of a user login screen.

FIG. 2A illustrates an example of a login screen visible to a user 12 on the interface 22 of their mobile device 18. A user 12 may login using the traditional sap system login 28 or choose to login in using a choice of secured third party service provider login 26 options. In this example, Facebook and LinkedIn are shown, however the system 10 may be configured to allow a user 12 to enter login information to any variety of secured third party service providers.

Figure 2B:
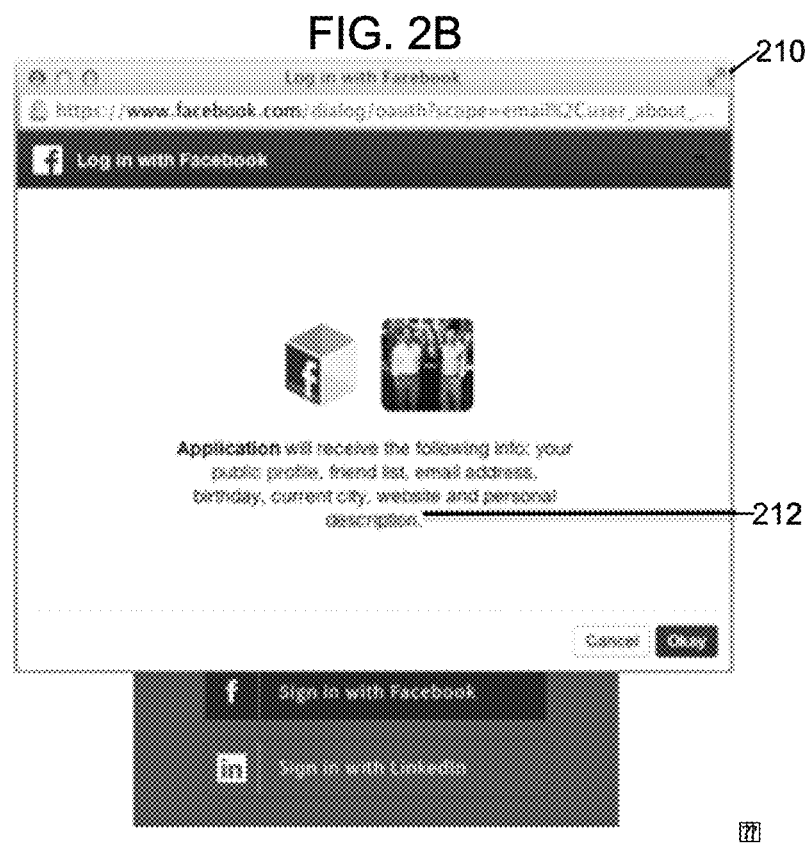
FIG. 2B illustrates a secured third party service provider authorization dialogue box.

FIG. 2B illustrates a secured third party service provider authorization dialogue box 210 visible to a user 12 who chooses to login to the system 10 through a secured third party service provider login 26. The secured third party service provider may request that a user 12 provide an additional approval before the secured third party service provider agrees to send to the system 10 any personal information 30 associated with a user 12. The system 10 collects the personal information 30, in this example, from the secured third party service provider database(s) 28, to identify a user 12 and to search for correlating event information 42 associated with a user 12. This personal information 30 may include, for example, the date of birth, full name 510, sex 514, and race 516, or geographic information 212 associated with a user 12, among other information, that a third party service provider database(s) 28 may possess on their databases, and are willing to share with the system 10.

The personal information 30 received from the secured third party service provider database(s) 28 is a mechanism for the system 10 to identify a user 12 without a user 12 also experiencing the inconvenience of entering a user's 12 personal information 30. In addition, the system 10 benefits from a login mechanism that safely and securely authenticates a user 12 through a trusted secured third party service provider (e.g., LinkedIn, Facebook, etc.). The system 10 collects valuable personal information 30 associated with a user 12 that the system 10 may later correlate with other information, including event information 42 and agency information 40, and to suggest and/or generate correlating documents 46 and additional services 64 that may be beneficial to a user 12.

Once the system 10 identifies a user 12, the system 10 sends a search query, by, for example, calling out over a secure connection to the API of event information databases 34, searching for event records 62 and/or event information 42 associated with a user 12 and/or according to other parameters found within the job data 48. The event information databases 34 respond to the search query by sending back to the system 10, event information 42 associated with a user 12. If event information 42 associated with a user 12 is located on event information databases 34, the acquisition system 32 receives the event information 42 associated with a user 12. The acquisition system 32 collects event information 42 (418) associated with a user 12 and uses a script to reformat specific event information 42 into the format of data fields 616 contained in data tables 618 on the system database 56.

FIG. 5 illustrates an example event record 62 sourced from event information databases 34 by the acquisition system 32. The event record 62 includes event information 42 associated with a user 12. The example event record 62 in FIG. 5 is for example purposes only and is not exclusive of the rich variety of event records 62 available to the system 10 as a result of sending search queries to event information databases 34. The type of event record 62, in this example, is a case disposition record 116 associated with an individual charged with a criminal offense. The example case disposition record 116 was sourced from the Fort Bend County, Texas District Clerk's event information databases 34. The case disposition record 116, and event information 42 contained in the case disposition record 116, may also be found on a variety of event information databases 34, including non-governmental entities that possess, collect, and/or aggregate event information 42. The case disposition record 116 in FIG. 5 includes a user's 12: full name 510, case number 512, sex 514, race 516, court name 518, address at the time of the charge 522, arrest date 524, the charged offense 528, and the final disposition of the charged offense 526, among other events and hearing information 520. Additional documents 46 of other events 520 may be scraped and downloaded by the acquisition system 32, in one of the variety of manners previously described. The system 10 may also be configured to utilize OCR 38 to quickly digitize large amounts of event information 42 in event records 62 that may be associated with a user 12.

If the system 10 identifies event information 42 associated with a user 12, such as the event information 42 in FIG. 5, based on data matches with a user's 12 personal information 30, the acquisition system 32 formats the event information 42 and stores the event information 42 on the system database 56. The system database 56 organizes event information 42 associated with a user 12, and personal information 30 associated with a user 12, in specific data fields 616 on the system's 10 data tables 618. The system 10 may use these data fields 616 to identify correlating event-related agency information 40, and also to identify and generate correlating documents 46 for a user 12 by populating fields 1110 on the form 60 that correlate with the corresponding data fields 616 on the system's 10 data tables 618.

FIG. 6 is an illustration of an example data table 618 on the system database 56 that may be populated with event information 42 associated with a user 12. For purposes of this example, the system's 10 job data 48 is configured to determine whether a user 12 meets the statutory requirements required under Chapter 55 of the Texas Criminal Code 124 required for a user 12 to file a petition for expunction FIG. 12 of public records. This data table 618 illustrated in FIG. 6 contains event information 42 associated with a user 12 relevant to the system 10 when determining whether or not a user 12 meets the statutory requirements in the event-related agency information 40 in order to file this particular correlating document 46.

The data table 618 in FIG. 6 is composed of rows and columns. The first column 610 identifies the category or particular type of event information 42 relevant to the system 10 when searching for correlations with the relevant event-related agency information 40. The second column 612 represents an example of the format of the possible values of the particular event information 42 associated with a user 12. Each row in the second column 612 is a data field 616 that may be populated by the system 10 with corresponding event information 42 associated with a user 12. For example, if the acquisition system 32 collects event information 42 associated with a user 12 that contains an arrest date, possibly in an arrest or case disposition record 116, the acquisition system 32 formats this particular event information 42 and places the event information 42, in this case, an arrest date, in the second column of this data table, on the row corresponding to arrest date. The third 614 and fourth columns are for reference purposes and identify the source and meaning of the event information 42 data fields 616, respectively. In this example embodiment, the job data 48 and service data 44 are configured to express the event-related agency information 40 in Chapter 55 of the Texas Criminal Code 124 and determine if event information 42 associated with a user 12 meets the statutory requirements for a user 12 to file a petition for expunction FIG. 12. The system 10 data fields 616 and data tables 618 are specifically designed for the job data 48 and service data 44 in this example and may be amended to accommodate other tasks, such as generating other documents.

In this embodiment, the system 10 in FIG. 1 searches for event information 42 associated with a user 12 that may suggest a user 12 was arrested and/or otherwise charged with committing a criminal offense. If relevant event information 42 associated with a user 12 is not found or insufficient to fully generate a correlating document 46, the system 10 will send a user 12 back to the system's 10 home screen where a user 12 may choose to view results of a user's 12 background check, based on the search results of event information 42 associated with a user 12, or to automatically generate correlating documents 46 by inputting information and/or answering system queries 712.

FIG. 7A and FIG. 7B collectively form 60 an example of an algorithm (420) that correlates event information 42 associated with a user 12, with relevant event-related agency information 40. The algorithm illustrated in FIGS. 7A and 7B is just one example of a method of correlating event information 42 with event-related agency information 40 available to the system 10. Algorithms, like the algorithm in FIGS. 7A and 7B, may be configured to accomplish a variety of different tasks and may be expressed through a variety of methods and scripts that are readable to the system 10.

FIG. 7A illustrates an example of the event information 42 component of the algorithm used in this example embodiment to correlate event information 42 with event-related agency information 40. FIG. 7A is essentially a conversion table that instructs the system 10 to assign specific values 720 to the variables (A-Z) 716, based on particular event information 42 that may be associated with a user 12 and available on the system database 56. The table illustrated in FIG. 7A has four columns, whereby the third and fourth column are continuations of the first and second columns, respectively. For purposes of clarity, the third and fourth column will each be referred to as the "first column" 710 and "second column" 714, respectively.

The first column 710 is a list of variables (A-Z) 716 and the second column 714 consists of job data 48 for the system 10 to run. The system 10 runs the job data 48 instructions in the second column 714 and assigns a numerical value (1-4) 720 to each variable, (A-Z) 716. The job data 48 in the second column 714 "Event information 42 Associated With User and Corresponding Value" consists of formulas, that utilize as components in the formulas, the specific event information 42 illustrated in the data table 618 in FIG. 6. For example, if the data field 616 "Arrest Date" on the data table 618 in FIG. 6 is not populated with a value (e.g. because the system 10 was not able to find an arrest date associated with a user 12), the system 10 assigns a numerical value 720 of 1 (e.g., A=1, if Arrest Date=no value) to Variable A 716. If, however, the "Arrest Date" data field 616 on the data table 618 in FIG. 6 contains a value (e.g. event information 42 associated with a user 12 includes an arrest date) the system 10 assigns a numerical value 720 of 2 (e.g., A=2, if Arrest Date=value) to Variable A 710. In the same manner, the system 10 assigns a numerical value 720 to the remaining variables 716 in the first column 710 according to the job data 48 in the second column 714. FIG. 7B includes Queries 712 as Variables 716 in column one 710 that may be assigned a numerical value 720 according to the job data 48 in the second column 714 based on whether the user 12 responded with a "yes" or "no" to the query 712.

FIG. 7B illustrates an example of the event-related agency information 40 components of an algorithm, which correlates event information 42 with event-related agency information 40. In this particular embodiment, the event-related agency information 40 expresses event-related agency information 40 from Chapter 55 of the Texas Criminal Code 124. The algorithm may be reduced to a script or computer code readable by the system 10, and may be included in the system's 10 job data 48 and/or service data 44.

The system 10 begins the algorithm illustrated in FIG. 7B with the Variable A 716 in the first column of the table in FIG. 7B under Step 1. The letters (A-Z) in the first column 716 of FIG. 7B correspond to the variables A-Z 716 in FIG. 7A. The remaining columns in the table illustrated in FIG. 7B provide instructions for the system 10 to run, based on the numerical values (1-4) 720 the system 10 assigned to the variables (A-Z) 716 in FIG. 7A. The numerical value (1-4) 720 assigned to a particular variable 720 will determine the path the system 10 will take through the algorithm in FIG. 7B. If the instructions corresponding to a particular variable's 714 numerical value 720 instructs the system 10 to proceed 724, the system 10 proceeds to the next row in the table, thus proceeding through the remaining variables 714 in the algorithm alphabetically. For Example, if variable A 716 from FIG. 7A is assigned a numerical value 720 of 2 (e.g., meaning that arrest date=value), the system 10 follows the instructions in the box corresponding to A=2 724, and instructs the system 10 to proceed to the next row of the algorithm, variable B. If however, no arrest date information is available in the Arrest Date data field 616 in FIG. 7A, then A=1, and the algorithm instructs the system 10 to communicate "Message 1" as one of the possible messages 718 to a user 12, possibly using a notification 52 from the notification system 58. The Message from the system 10 to a user 12 may also be communicated in the form 60 of a pop-up, or similar text object, that a user 12 views on the interface 22 of a user's 12 computer 16 or mobile device 18.

FIG. 7C illustrates an example tables consisting of messages 718 and queries 712 that the system 10 may communicate to or request from a user 12, based on the instructions of the algorithm in FIGS. 7A and 7B. The notification system 58 triggers a query 712 or message 718 to a user 12 that is viewed on the interface 22 of a user's 12 computer 16 or mobile device 18. The system 10 may also be configured to query 712 a user 12 as a method of verifying event information 42 associated with a user 12. For example, queries 712 could automatically be triggered if event information 42 associated with a user 12 correlates with event-related agency information 40, but the system 10 wants to verify that the event information 42 associated with a user 12 is actually a user 12, and not another individual.

The system 10 may also query 712 a user 12 to offer additional services 64 or to collect additional information from a user 12. The system 10 may continue to generate documents 46 in the event a user 12 ignores queries 712 from the system 10. However, the queries may provide a user 12 with insight on risks that a user 12 may be exposed to during the process of generating and/or filing a petition for expunction FIG. 12 and/or based on particular event information 42 associated with a user 12. If the algorithm in FIG. 7B instructs the system 10 to "Generate Form" 722, the system 10 begins generating a correlating document 46 (e.g., the petition for expunction FIG. 12 of public records) for a user 12. The Generate Form 722 instructions indicate that a correlation exists between event information 42 associated with a user 12, event-related agency information 40, and a correlating document 46, the petition for expunction FIG. 12 of public records (422). In other words, event information 42 associated with a user 12 meets the statutory requirements for a user 12 to file a petition for expunction FIG. 12 of event records 62, according to Chapter 55 of the Texas Criminal Code 124.

A formatting system 74 may further format event information 42 and personal information 30 associated with a user 12 to correlate with fields on a particular template form 60 that is used by the system 10 to generate a document 46. The formatting system 74 may also receive event information 42 and personal information 30 in many forms 60, and then store the event information 42 and personal information 30 associated with a user 12 on data tables 618 designed-to populate a particular form 60. A formatting system 74 may be employed to clean or otherwise reformat data in the job data 48. For example, the formatting system 74 may appropriately title case words in the job data 48 (i.e., may re-format words in all-capital letters to use appropriately capitalized/un-capitalized letters) (332). As another example, the formatting system 74 may check address information 830 associated with a user 12 or any other address, such as the address of a governmental agency 122, that is listed in the document 46, e.g., to include or correct zip code information, or otherwise make ready at least some of the job data 48 for delivery to a user 12. The system 10 will assign values to the event information 42 based on the source and content of particular event information 42 associated with a user 12. The formatting system 74 then sends any formatted event information 42 and personal information 30 into data fields 616 that correspond to the numbered fields 1110 on the correlating documents 46.

After running the algorithm illustrated in FIGS. 7A and 7B, the system 10 may display (424) to a user 12 any event information 42, arrest and/or criminal offense and case disposition records 116, associated with a user 12. If event information 42 associated with a user 12 meets the statutory requirements for filing a petition for expunction FIG. 12 of public records, a separate category of event information is listed for the user 12 to view (426) to shows criminal offense information that meets the statutory requirements for the user 12 to file a petition for expunction FIG. 12. A user 12 may click on a link to (428) complete on a corresponding link to begin generating the necessary documents 46. The system 10 selects (430) the appropriate legal forms 60 from the legal forms database 58. (In this example, a form 60 used to generate a petition for expunction FIG. 12). The system 10 may generate additional documents 46 for a user 12 that correlate to the correlating document 46, the petition for expunction FIG. 12. Additional documents 46 include, for example, an order of expunction, civil case filing form, letters to an employer, notice letters to private entities possessing event information 42, and other correlating documents 46 to the petition for expunction FIG. 12 generated for a user 12. The system 10 may generate a Notice of Nondisclosure for a user 12 who meets the statutory requirements for this document 46, but, perhaps, may not meet the statutory requirements for filing a petition for expunction FIG. 12. Although both documents 46 effectively limit disclosure of event information 42 associated with a user 12, a user 12 may have a preference for a particular correlating document 46 over another correlating document 46. If a user 12 meets the statutory requirements for more than one correlating document 46, the system 10 may select a particular correlating document 46 or query a user 12 to select a correlating document 46 from a list of possible options identified by the system 10.

Once the system 10 identifies and selects the relevant correlating documents 46, based on the job data 48, the system 10 generates correlating documents 46 by populating (432) numbered fields 1110 on a template form 60, referred to throughout this description as a form 46. A form 60 contains numbered fields 1110 that correlate with personal information 30, event information 42, and/or event-related agency information 40 data fields 616 associated with a user 12. These numbered fields 1110 contain information that must be included in the correlating documents 46. The form 60 or form(s) 60 are stored in a forms database(s) 58 on the system 10.

FIG. 8A illustrates an example of event-related agency information 40 processed by the system 10. A petition for expunction FIG. 12 generated by the system 10 includes a list of all law enforcement agencies 814 in a petition for expunction FIG. 12 generated for a user 12. FIG. 8A is an excerpt of Chapter 55 of the Texas Criminal Code 124. This chapter correlates to event information 42 associated with a user 12 who may be interested in filing a petition for expunction FIG. 12 of event information 42 associated with the user 12. The event-related agency information 40 in FIG. 8A also correlates to a document 46, a petition for expunction FIG. 12. The system 10 correlates the event information 42 associated with a user 12 with event-related agency information 40, like in FIG. 8A, and may determine if a user 12 meets statutory requirements for filing a petition for expunction FIG. 12. If the system 10 determines that a correlation exists that indicates a user 12 meets the statutory requirements in the event-related agency information 40, the system 10 searches a forms database 58 for a petition for expunction FIG. 12. The system 10 then correlates a petition for expunction FIG. 12 with event-related agency information 40, and event information 42 associated with a user 12 that correlates with numbered fields 1110 on a form 60 used by the system 10 to generate a petition for expunction FIG. 12.

FIG. 8A contains event-related agency information 40 the system 10 may use to determine which personal information 30 and event information 42 associated with a user 12 must be included in a petition for expunction FIG. 12. The event-related agency information 40 in FIG. 8A also correlates with agency information that must be included in a petition for expunction FIG. 12 according to event-related agency information 40 (see 814 for agency information that is also event-related agency information 40 contained in event-related agency information 40). A petition for expunction FIG. 12 generated by the system 10 complies with event-related agency information 40 by including in a petition for expunction FIG. 12 all required information that must be included in a petition for expunction FIG. 12, according to the event-related agency information 40 in the statute used as an example, Chapter 55 of the Texas Criminal Code 124.

The event information 42 to be included in a petition for expunction FIG. 12 is event information 42 in event records 62 collected by the system 10 from event information databases 34 that must be included in a petition for expunction FIG. 12, according to the event-related agency information 40. Event information 42 that must be included in a petition for expunction FIG. 12 includes a user's 12 full name 510, sex 514, race 516, address at the time of arrest 522, the offense charged 528 against a user 12, the date of arrest 524, case number 512, and the court of offense 518. Agency information 40, that may also be event-related agency information 40, and that also must be included in a document 46, according to event-related agency information 40 is a list of law enforcement agencies 814 that are suspected of possessing event information 42 associated with a user 12 with respect to the arrest or criminal offense 528 the user 12 seeks to expunge.

FIG. 8B illustrates an example of event-related agency information 40 processed by the system 10. A user 12 who is arrested or charged with a crime proceeds through the criminal justice process 816. During this time, a user 12 will proceed and communicate with a variety of agencies based on a user's 10 charges and final case disposition. Various governmental entities may transact with a user 12 in the criminal justice process 816 and generate event records 62 associated with a user 12. Governmental entities also transmit event records 62 and event information 42 associated with a user 12 to other private and governmental entities. FIG. 8B is an example of event-related agency information 40 that the system 10 considers in an algorithm that identifies which governmental entities possess event information 42 associated with a user 12. By correlating event information 42 associated with a user 12, with event-related agency information 40 in FIG. 8B, the system 10 may identify a user's 12 transactions with governmental entities during the criminal justice process 816. For purposes of generating a petition for expunction FIG. 12, the system 10 generates a list of law enforcement agencies 814 suspected of possessing event information 42 associated with a user's 12 arrest and/or criminal offense. The system 10 first identifies the names of governmental entities that are contained within event records 62 and event information 42 collected by the system 10. The system may utilize OCR 38 or any of the other techniques for collecting and analyzing data described above. The system 10 then determines which agencies may also possess event records based on the user's 12 path through the criminal justice process 816. The system 10 may include a governmental entity on the list of law enforcement agencies 814 contained in a petition for expunction FIG. 12 if a governmental entity is 1) a source of event information 42, 2) named, or is a party to, event information 42 associated with a user 12, and/or 3) a particular governmental entity if the system 10 determines a governmental entity transacted with a user 12 as a result of the criminal justice process 816.

FIG. 8C illustrates an example of event-related agency information 40 collected by the system 10. FIG. 8C is an example of a governmental entity's data migration policy 126. The example county clerk reporting requirements 126 in FIG. 8C illustrate an example of agency information 40 that is also event-related agency information 40 and describes the data migration policy 126 of a particular governmental entity, in this example, a county clerk. FIG. 8C lists the event record 62 or event information 42 that is transmitted to another governmental entity in one column 820, the recipient governmental entity and their contact information 122 in another column 822, and when the event record 62 or event information 42 is sent 824. By correlating event-related agency information 40 in FIG. 8C with event information 42 associated with a user 12, the system 10 may determine whether or not a particular governmental entity possessing event information 42 associated with a user 12 and/or also generated or transmitted event information 42 to another governmental entity, based on the particular governmental entity's data migration policy 126 for a particular event record 62. The system 10 queries agency information databases 36 for the data migration policy 126 information associated with a governmental entity, if the governmental entity is 1) a source of event information 42, 2) named, or is a party to, event information 42 associated with a user 12, or 3) if an entity transacted with a user 12 as a result of the criminal justice process 816. The data migration policies 126 of these governmental entities will identify additional governmental entities that are suspected of possessing event information 42 associated with a user 12 by determining whether a particular governmental entity received event information 42 from another governmental entity, based on the data migration policy 126 of a governmental entity known or suspected by the system 10 of possessing event information 42 (e.g., For example, when the system 10 collected event information 42 from that governmental entity or because the system determined that a governmental entity transacted with a user 12 during the criminal justice process 816.).

FIG. 8D and FIG. 8E illustrate examples of data tables 618 listing contact information 122 of specific governmental entities. The first column in FIG. 8D is a list of court names 518, and the second column identifies the type of court 826. The third column identifies the county 828 associated with a particular court name 518. The address and contact information 122 for the court is also available in this data table 618 in the remaining columns of the data table 618. The system 10 may use this agency information 40 to, for example, populate a document 46, transmit a document 46 to a governmental entity, or provide a user 12 with a court's contact information 122. In this embodiment, the system 10 correlates the names from the list of law enforcement agencies 814 with the contact information 122 for the particular law enforcement agencies on contained in the list of law enforcement agencies 814. The name and contact information 122 of the list of law enforcement agencies 814 are aggregated and placed on a data table 618 on the system database 56. Once formatted properly, the data fields 616 containing the list of law enforcement agencies 814 are matched with the correlating numbered fields 1110 on the template form 60 used by the system 10 to generate a petition for expunction FIG. 12 for a user 12. FIG. 8E illustrates an example data table of law enforcement agencies for each county 832. The first column identifies the name of the county 832 and the second column lists law enforcement agencies 834 located in the particular county name 832 in column one.

The system 10 automatically generates a list of law enforcement agencies 814 suspected of possessing event information 42 associated with a user's 12 arrest or criminal offense. The system 10 may run a script expressing an algorithm that calculates the data migration of event records 62 associated with an event, or series of events, associated with a user 12 based on agency information 40 associated with a governmental entity's data migration policy 126. FIG. 9 illustrates a table with job data 48 directing the system 10 to generate a list of law enforcement agencies 814. The job data 48 considers the governmental entity that created the event record 62 or event information 42, the data migration policy 126 of that governmental entity with respect to a particular type of event record 62, and the data migration policy 126 of any governmental entity recipients of event information 42 from the particular governmental entity that generated the event record 62 and/or event information 42. The job data 48 also considers state and federal criminal reporting requirements, including the (UCRA) Uniform Crime Reporting Act to determine if additional law enforcement agencies should be included in the list of law enforcement agencies 814. The first column 910 contains law enforcement agencies that may transact with a user 12 during the criminal justice process 816. The data migration variables (A-M) 912 listed in the second column of FIG. 9 correlate to the law enforcement agencies in column one 910 and the event-related agency information 40 associated with a transaction in the Criminal Justice Process 816. The remaining four columns contain job data 48 specific to the type of criminal offense: Felony 914, Class A Misdemeanor 916, Class B Misdemeanor 918, and Class C Misdemeanor 920, respectively.

The system 10 identifies any governmental entities that are identified in event records 62 and event information 42 collected by the system 10, regardless of whether that particular governmental entity created the event records 62 and event information 42, in order for the system 10 to include these governmental entities in the list of law enforcement agencies 814. Once the list of law enforcement agencies 814 is generated, the system 10 populates the mailing address and/or e-mail (depending on the notice requirements when filing the petition for expunction FIG.

12.) of the respective governmental entity using agency information 40 sourced from agency information databases 36. The system 10 then populates this information into the appropriate field or position of the petition for expunction FIG. 12.

FIG. 10A illustrates an example of a data table 618 with data fields 616 that contain personal information 30 and event information 42 associated with a user 12 used by the system 10 to populate the petition for expunction FIG. 12. The data table 618 illustrated in FIG. 10A is an example of a data table 618 that contains data fields 616 correlating to numbered fields 1110 on a particular form 60, and is not exclusive of the possibilities of data tables 618 or data fields 616 that may be utilized in the system 10. The data table 618 in FIG. 10A includes twenty-three (23) data fields 616. The numbered data fields 616 on this data table 618 correlate to numbered fields 1110 on a form 60 used by the system 10 to generate documents 46 for a user 12. The first column 1010 lists the numbered field 1110 on a form 60 that a particular data field 616 correlates with. The second column 1012 is for information purposes and may be included in the system's 10 job data 48 to direct the system 10 as to which event information 42 and/or personal information 30 to search for and collect in order to populate a particular data field 616. The third column 1014 illustrates data fields 616 correlating to a particular numbered field 1110 on a form. The formatting system 74 formats event information 42 and personal information 30 collected by the acquisition system 32 that correlates to a numbered field 1110 on form 60. Once formatted, the formatting system 74 may place the formatted information into data fields 616 until the system 10 needs them to populate a correlating numbered field 1110 on a form 60. FIG. 10B is a data table 618 that the system 10 uses to populate numbered fields 1110 on the form 60 that correlate with the list of law enforcement agencies 814 contained within a petition for expunction FIG. 12.

FIG. 11A-11E illustrate an example of a Form 60 that will be populated by the system 10 to create a petition for expunction FIG. 12 for a user 12. The black squares containing white numbers illustrate examples of numbered fields 1110 on a form 60. The system 10 correlates data fields 616 on the system database 56 with (e.g. in this example, the data fields 616 on the data tables 618 illustrated in FIG. 10A and FIG. 10B) with correlating numbered fields 1110 on a form 60 to generate a correlating document 46 for a user 12. The form 60 that the system 10 populates is based on the correlations of agency information 40 and event information 42 associated with a user 12. For example, this particular form 60 illustrated in FIG. 11A-11E is designed to generate a petition for expunction FIG. 12 of public records for a user 12 who meets the statutory requirements under Chapter 55 of the Texas Criminal Code 124 to have a criminal offense record and/or arrest record 114 expunged, because the criminal offense charged against a user 12 did not result in a final conviction. The system 10 may utilize a different form 60, for example, if a user 12 qualifies under a different statute or for any other reason.

FIG. 12A-12E illustrate an example of correlating documents 46 generated by the system 10 for a user 12 by populating the numbered fields 1110 on the form 60 in FIG. 11A-11E with the information from the data fields 616 in FIG. 10A. In this example, the system 10 generated a petition for expunction FIG. 12 for a user 12 after determining that the event information 42 associated with a user 12 met the statutory requirements contained within the event-related agency information 40. A petition for expunction FIG. 12 is personalized for a particular user 12. A petition for expunction FIG. 12 includes event-related agency information 40, personal information 30, agency information 40, and event information 42 associated with a user 12.

Private entities may compile and disseminate, possibly for compensation, event information 42 that includes criminal and/or arrest records 114, and case disposition records 116 associated with a user 12. These private entities may be included in the list of law enforcement agencies 814 in the petition for expunction FIG. 12. If the petition for expunction FIG. 12 is filed, the private entity will receive notice of the hearing associated with a user's 12 petition for expunction FIG. 12. In Texas, however, private entities may not challenge a petition for expunction FIG. 12. The system 10 may exclude these private entities off the list of entities on the petition for expunction FIG. 12, because the private entities may not challenge the petition for expunction FIG. 12, and the private entities must comply with an order of expunction signed by the judge. An order of expunction is a document 46 that a judge signs if the court grants a user's 12 petition for expunction FIG. 12. In Texas, an individual who is in possession of event information 42 or event records 62 that are subject to an order of expunction may be charged with a Class B Misdemeanor. The system 10 may query event information databases 34 associated with private entities (e.g. background check companies, mug shot websites, etc.) to determine if a private entity possesses event information 42 associated with a user 12 and is subject to an order of expunction. The system 10 may then automatically generate a demand letter to be sent to the private entity directing the private entity to destroy or return to a user 12 the event information 42 subject to the order of expunction.

The system 10 searches the Internet, and possibly other networks 20, for private entities and other websites that the system 10 suspects of possessing event information 42 related to a user's 12 petition for expunction FIG. 12. Once a user 12 files a petition for expunction FIG. 12 with a Court Clerk (Either through e-file 50 or in-person), a user's 12 trial date(s) and the case filing history becomes event information 42 contained in an event record 62 stored in event information databases 34, among other places.

If the system 10 cannot populate all numbered fields 1110 with the information sourced from the various sources, the system 10 queries (436) the user 12 in order to populate the remaining numbered fields 1110 on the form 60 required to generate the documents 46. Once the numbered fields 1110 on a form 60 are populated, the correlating documents 46 are generated, and the correlating documents 46 may be purchased by a user 12, for example, in a shopping cart 54 connected to the system 10. The system 10 may then allow a user 12 to download 66, print 68, (452) or send the correlating documents 46 as an attachment in an electronic message.

Once a user 12 completes a transaction (438) and places the documents 46 in the shopping cart 54 on the system 10, a user 12 may also (440) download 66, print 68, save, edit, or e-mail documents 46. A user 12 may then (442) e-file 50 the petition for expunction FIG. 12 with an appropriate Court Clerk, directly from the system 10. The system 10 will provide a user 12 with directions 70 to a (446) Court Clerk and provide a user 12 with a completed filing request form 60 containing the cost of filing a document 46, according to event-related agency information 40.

The system 10 calls out search queries to event information databases 34 for event records 62 associated with a user 12 or a document 46 that was filed by a user 12. For example, the system 10 may collect (448) event records 62 associated with case filings in the Jurisdiction where a user 12 filed a document 46. The system 10 may send notifications 52 to a user 12 if there are any new updates on the status of a document 46 filing, including confirmation (444) that a court clerk received the documents 46 by e-file 50, and provide other event information 42 to a user 12. The system 10 uses this event information 42 in order to send personalized notifications 52 to a user 12 associated with upcoming trial date(s) (450) or any other updates or changes to the status (456) of a user's 12 filing by correlating event information 42 associated with a user 12 in the calendar to the event-related agency information 40 associated with the rules of civil and criminal procedure for a particular jurisdiction. A user 12 may also access the system 10 to check the (454) status of user's 12 petition for expunction FIG. 12 filing.

The system 10 may be configured to automatically generate a variety of beneficial documents 46 for a user 12. These documents 46 may include documents 46 associated with creating wills 132, trusts 130, divorce documents, pre-marital agreements, corporate or agency law 138, or any other type of document 46 template 134 that a user 12 may desire. The system 10 may also be configured to allow a user 12 to upload their own forms 60 for the system 10 to automatically generate into documents 46. A user 12 may, for example, identify numbered fields 1110 on the form 60 for the system 10 to populate with event information 42 and personal information 30 associated with a user 12. A user 12 may configure the job data 48 to correlate specific information to specific fields on the forms 60. The system 10 may then populate the fields with information associated with a user 12 on the system database 56. A user 12 may create or edit data may benefit from the automated generation of these documents 46. For example, a user 12 may have specialized knowledge related to a particular class of the agency information 40, such as a criminal defense attorney with knowledge of a criminal code, and the system 10 could be configured to include only the agency information 40 related to the agency information 40 or event-related agency information 40 that is of interest and/or associated with a user 12 and/or a user's 12 client.

A user 12 may wish to use the system 10 to minimize the time required to generate a document 46, while maximizing the accuracy of the document 46. By using the automatic document 46 generation system 10, a user 12 may generate documents 46 that only require user 12 input in the fields 1110 on a form 60 that are not automatically populated with personal information 30 or event information 42 associated with a user 12. A user 12 may review the document 46 and make changes to any fields 1110 on the form 60 that may be incorrect or require editing based on possible errors or inaccuracies found in the event information 42 or personal information 30 associated with a user 12 and collected the system 10 using the above-described methods of data collection.

Of course, techniques described herein are merely examples, and many other modifications and implementations are possible. For example, a user 12 may include, or refer to, more than one user 12, or to an entity, e.g., a corporate entity. As another example, FIG. 1 may include an artificial intelligence engine as part of the rule engine previously mentioned, and configured to determine the inferred event from the event information 42.

Thus, while certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

Additional Embodiments of the Invention

An envisioned embodiment will undoubtedly incorporate new or adjusted algorithms, in addition to the algorithms shown in FIG. 7 and FIG. 9. The additional algorithms, when combined with more correlating information and forms 60 (See FIG. 1C for examples of different forms 60 databases 58), will allow the system 10 to generate correlating documents 46 for a variety of purposes that comply with requirements in agency information 40. The system 10 may be configured for increased functionality and document automation for a user 12 by correlating events, services, and information associated with a user 12. The system 10 may be configured to search and collect information associated with a user 12 from secured third party service provider databases 28, correlating with more agency information 40 converted into algorithms to be processed by the system 10, in order to limit the need for user 12 input while providing verification of user 12 input based on a user's 12 responses to queries used to populate a particular field on a form. The system may query the relevant information databases associated with a field 1110 to determine if a user's 12 entry may contain an error. For example, a user 12 may enter an incorrect name in a field 1110 on a form 60, and the system 10 may query information databases associated with a user 12 to determine if the entry is incorrect.

An envisioned embodiment of the invention reviews user 12 populated sections of a legal document 46 to see if a user 12 who may be the subject of a contract or legal instrument fails to meet agency information 40 requirements associated with that particular field 1110 and event information 42 disqualifying the subject individual. That is, if a user 12 is forming a contract with someone who is legally incapacitated, the system 10 can alert a user 12 that event information associated with the subject individual renders the subject individual incapacitated to enter a contract. The system 10 may reach this determination by correlating the user's 12 entry for a particular field 1110 on a form 60 with event information 42 associated with the name entered in that field 1110 by the user 12. The system then correlates the event information 42 associated with the name entered by the user 12, with event-related agency information 40 to determine if the name entered in the field 1110 by the user 12 fails to meet the statutory requirements as a result of some disqualifying event contained in event information 42 associated with the name entered in the field 1110 by the user 12 (e.g., Contract with a bankrupt company, incapacitated person, minor, felon, etc.). Combining background checks with forms 46 to identify correlation that a user 12 may not have known or otherwise considered provides a means for the user 12 to automatically verify an entry typed into a field 1110 on a form 60 used to generate document 46.

An envisioned embodiment of the invention may be configured to automatically locate the registered agent of an entity in response to a user 12 populating a numbered field 1110 on a form 60 correlating to entity names. A user 12 may begin to enter the entity name, and the system 10 may correlate the numbered field 1110 on the form 60 with event information 42 or agency information 40 to determine if a user's 12 entry contains an error. The system 10 may also make suggestions for a user 12 based on correlations with the numbered field 1110 on a form 60, and agency information 40 and event information 42 associated with a user 12. A user 12 types the name of registered entity into the numbered field 1110 on a form 60 that must contain a business entity's name or registered DBA ("Doing business as"). The system 10 queries the event information databases 34 to correlate a user's 12 entry with event information 42 associated with the business entity entered in the numbered field 1110 by the user 12. If a user's 12 entry matches the correlating event information 42, the system 10 automatically populates any remaining fields 1110 on the form 60 that correlates with the event information 42 collected for particular field 1110 on a form 60 that the user 12 entered a business entity's name. If a user 12 misspells a registered company's name, the system 10 notifies a user 12 to correct a user 12 error to reflect a correct entry according to event information 42 available to the system 10.

An envisioned embodiment of the invention allows a user 12 to generate a will 132 based on a form 60 that is relevant to a user 12. Once a user 12 logs in through a secured third party provider login 26, like in the example above where a petition for expunction FIG. 12 was generated, the system 10 will identify a user 12 and query event information databases 34 for all property interests that match a user's 12 personal information 30. The system 10 automatically populates relevant fields 1110 on will form 60 templates with the event information 42 associated with a user 12.

The system 10 may suggest that a user 12 include certain assets identified by the system 10 to eliminate the need for a user 12 to enter the data. The system 10 may also suggest devisees based on event records 62 sourced from event information databases 34 and the information received from the secured third party service provider databases 28. The system 10 may also provide notice to devisees in a will 132 by identifying a user's devisees by name in a will 132 and sending the devisees a notification 52 through the notification system 58 based on the contact information available to the system 10 from the event information databases 34, third party service provider databases 28, and/or the user 12.

An envisioned embodiment of the system 10 sends search queries across the internet to locate websites that possess event information 42 associated with a user 12. A user 12 may then choose to respond or have the system 10 respond automatically with an automatically generated document 46. The document 46 may be used to provide the owner of the website with notice that the possession of the event information 42 correlates with a violation of agency information 40 requirements, and that a beneficial document 46 has been generated for a user 12. The system 10 may deliver the document 46 by e-mail or allow a user 12 to print 68 and mail the letters manually. This service allows users 12 of the system 10 to monitor the presence of event information 42 associated with a user 12 across the Internet. A user 12 now has the benefit of responding to websites that possess event information 42 associated with a user 12 that a user 12 may want to be aware of and/or request the event information 42 associated with the user 12 be removed.

An envisioned embodiment of the invention calls out to the event information databases 34 to create or edit entries in a user 12, organization, or lawyer or law firm's calendar. The system 10 calls out to public record databases to collect event information 42 associated with a court's docket or calendar that is also associated with a user 12. The system 10 will call out to public record databases to collect event-related agency information 40, like the Federal (or State) Rules of Civil and/or Criminal Procedure, and format the information to be expressed in the form 60 of an algorithm. The event information 42 associated with a user 12 is given a numerical value and plugged into an algorithm of event-related agency information 40 to identify correlations between the various information that may be useful or beneficial to a user 12. For example, the system 10 may notify a user 12 by sending a notification 52 through the notification system 58. Notifications 52 could alert a user 12 about an approaching deadline for filing 128 documents 46, responding to a discovery request, or for a trial appearance date based on the event information 42 associated with a user 12.

An envisioned embodiment of the invention automatically generates a deed or land sale contract based on the event information 42 associated with the registered owner in the public records databases. The system 10 may be utilized to generate title opinions and other documents 46 as well. The event-related agency information 40 would include relevant statutes with respect to real property and determining the owner of, and/or issues associated with the transferring of ownership, to title in real property. The system 10 would source the information and generate the documents 46 similar to the processes outlined above for generating the petition for expunction FIG. 12. The system 10 may be configured to include this event-related agency information 40 expressed in the form 60 of an algorithm. The event information 42 may be assigned numerical values by the acquisition system 32 and/or the formatting system 74 for the relevant event information 42 associated with a user 12 and/or property. The algorithm may be configured to determine if any title issues exist based on the relationship of the event information 42 with the event-related agency information 40. The system 10 would reach this determination based on the result of the algorithm after the numerical values assigned to the variables corresponding to the event information 42 are included in the algorithm expressing the event-related agency information 40. The system 10 could then populate a form 60 using the event information 42 to generate a document 46 for a user 12. The document 46 may be a title opinion or other document 46 of interest to a user 12. A user 12 may insert new forms 60 and set new rules for the system's formatting system 74 to consider when generating documents 46.

An envisioned embodiment is one that utilizes the same system 10 design as in FIG. 1, using the secured third party service provider login 26 for authenticating a user 12 at login, the system 10 may then call out by secure connection to the API of the same secured third party service provider's databases 28, or a different secured third party service provider's databases 28, to add increased functionality and additional services 64 by taking advantage of cloud-based platforms offered by the secured third party service provider. For example, Wolfram Alpha allows developers to call out to Wolfram Alpha's API in order to create new products and services that leverage computable knowledge of information and to enhance existing web properties of the system 10. The system 10 uses this increased functionality from Wolfram Alpha to analyze trends in case law 144 event information 42 or changes in event-related agency information 40. The increased analytics 146 will be tied to trigger a notification 52 to a user 12 in the event that a user 12 is interested in learning more about a particular statute found in the agency information 40 and how that statute relates to event information 42 (e.g., like the number of arrests as a result of the statute). A user 12 may query the system 10 to provide analytics that may be helpful in analyzing the public records information that may be of particular interest to a user 12. If a user 12 is an attorney, a user 12 may benefit from analysis that compares agency information 40 across different states or jurisdictions to determine the percentage of cases that were successful under a particular statute compared with the statute of the other jurisdiction. The system 10 may also save in aggregate user 12 personal information 30 as a dataset that can be compared with public records information.

An envisioned embodiment of the invention calls out to the public records information databases for public records information, including event information 42 associated with a user 12 that can be plugged into an algorithm or series of algorithms that expresses relevant event-related and/or document-related agency information 40 in order to make inferences or conclusions based on the result of the algorithm after the event information 42, which may assigned values by the acquisition system 32, is used as the variables in the algorithm(s). The system 10 could identity what form 60 or document 46 may be needed, the likelihood of success based on the results of others found in event information 42 associated with other individuals, and to determine what information may require query responses from a user 12.

An envisioned embodiment of the invention calls out to third party service provider databases 28 to collect personal information 28 associated with a user 12, or user(s), that may also correlate to a particular document 46. Information from personal social media accounts, e-mail accounts, and other websites that gather 12 personal information 30 is gathered would provide the information necessary to both identify beneficial documents 46 for a user 12, and then populate the documents 46 with the personal information 30. The data mining techniques, and other techniques, may be employed to send search queries to the third party service provider databases 28 that a user 12 identifies as having an account with or by identifying third party service providers that a user 12 has an account to login 26 with. The system 10 may also make suggestions to a user 12 of websites that may contain information that is beneficial to the automatic generation of a particular document 46 or area of documents 46. Information from social media, e-mail, health care providers 142, educational institutions, and other third party service providers may provide valuable information to a user 12. The system 10 may collect this information associated with a user 12, format the information into data fields 616 similar to the manner described in the above examples, such as in FIG. 1, and assign numerical values to the information based on an algorithm or series of algorithms that represent agency information 40, or to make any other inference or determination based on information, and then to identify, suggest, and/or provide documents 46 and solutions for a user 12 that correlate to the information or that are based on the inferences and determinations reached on the analysis of the information with respect to the results of the algorithm. If the system 10 identifies a correlating document 46 to the information, the system 10 may automatically generate the documents 46 and use the information associated with a user 12 to populate the documents 46. Information available with different third party service providers that provide different services, or are otherwise associated, with a user 12 each may possess information that collectively would allow for determinations or inferences to be reached and also documents 46 to be generated or suggested by the system 10 for a user 12. A user 12 may automatically generate a will 132 document 46 that contains all of a user's 12 assets and family members by sourcing event information 42 and personal information 30 associated with a user 12 and correlating that information to numbered fields 1110 on a form 60 designed to generate a will 132 document. The system 10 may locate assets by connecting to a user's 12 third party service provider, for example mint.com, to determine the assets that a user 12 may be to include in a will. The system 10 may then send search queries for event information 42 that may provide the system 10 with information on possible family relationships associated with a user 12 as well as additional assets as well as geographic information associated with a user 12. The system 10 may also source particular personal information 30 containing information on the interactions of a user 12 with the other social media websites and call out search queries, with a user's 12 permission, to these secured third party service provider databases 28 to collect the personal information 30 that will identify on the extent of a user's 12 relationships and interactions with other individuals to determine how, and possibly to whom, a user 12 interacts with, and may want to consider including in a user's 12 will. This information may be correlated with event-related agency information 40 associated with a numbered field 1110 on a form 60 designed to generate a will document 46 for a user 12. The system 10 may then populate the form 60 with the personal information 30 sourced from the third party service providers and event information 42 in order to generate a will document 132. The system 10 may determine the possible recipients a user 12 may wish to include in a will 132 based on the relationships interactions of a user 12 with other individuals. The system 10 may also correlate the personal information 30 associated with a user 12, including geographic information associated with a user 12 and/or a user's assets, with the document-related agency information 40 to suggest strategies or documents 46 to a user 12 that may benefit a user 12, by, for example, reducing a user's 12 tax consequence or the tax consequence of a user's 12 devisee(s). A user 12 may edit a document 46 or populate fields 1110 on the document 46 that the system 10 was not able to populate automatically.

The envisioned embodiment will use social media, web history, and other digital records from secure third party service provider databases to assist in document 46 generation as well as discovery assistance. The invention could use an algorithm designed to identify responsive data and a user 12 could allow the system 10 permission to access a user's 12 personal digital records, possibly on their personal computer 16 or mobile device 18, in order to aid with discovery or to identify digital information in advance of litigation by correlating information in personal digital records of a user 12 and agency information, including event-related agency information 40. The envisioned embodiment could determine responsive discovery material in advance of litigation as an effort to avoid litigation. The algorithm can also be adjusted to account for different industries and lawsuit types as well as to accommodate for current litigation.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Specific details are given in the above description to provide a thorough understanding of various preferred embodiments. However, it is understood that these and other embodiments may be practiced without these specific details. For example, processes may be shown in diagrams in order not to obscure the embodiments in unnecessary detail. In other instances, well-known processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described above, and/or a combination thereof.

Also, it is noted that the embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed but could have many additional steps not included in the figure. A process may correspond to a method, a function, a procedure, a subroutine, a subprogram, etc. When a process corresponds to a function, its termination corresponds to a return of the function to the calling function or the main function.

Embodiments of the invention may involve middleware and/or other software implementations; the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may be downloadable through an Internet connection service. As used herein, the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read-only memory (ROM), random access memory (RAM), magnetic RAM, core memory, magnetic disk storage mediums, optical storage mediums, flash memory devices and/or other machine-readable mediums for storing information. The term "machine-readable medium" includes, but is not limited to portable or fixed storage devices, optical storage devices, wireless channels, and/or various other storage mediums capable of storing that contain or carry instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

While the principles of the disclosure have been described above in connection with specific methods, it is to be clearly understood that this description is made only by way of example and not as limitation on the scope of the disclosure. Whether now known or later discovered, there are countless other alternatives, variations and modifications of the many features of the various described and illustrated embodiments, both in the process and in the system characteristics, that will be evident to those of skill in the art after careful and discerning review of the foregoing descriptions, particularly if they are also able to review all of the various systems and methods that have been tried in the public domain or otherwise described in the prior art. All such alternatives, variations and modifications are contemplated to fall within the scope of the present invention.

Although the present invention has been described in tennis of the foregoing preferred and alternative embodiments, these descriptions and embodiments have been provided by way of explanation of examples only, in order to facilitate understanding of the present invention. As such, the descriptions and embodiments are not to be construed as limiting the present invention, the scope of which is limited only by the claims of this and any related patent applications and any amendments thereto.

Other embodiments will be evident to one of ordinary skill in the art is illustrated in the attached Exhibit A incorporated herein by reference.

The invention claimed is:

1. A method for intelligently and automatically generating appropriate formatted event documents, comprising:
   a) authenticating the identity of a user;
   b) determining agency information available;
   c) collecting said agency information;
   d) matching an event associated with said user;
   e) determining an inferred event based at least in part on said event using an algorithm associated with said event, wherein said inferred event is directly related to said event;
   f) correlating and relating said inferred event with said event by examining said agency information;
   g) determining the type of document to create based on said inferred event by correlating said inferred event with said agency information;
   h) generating a document, based on said determined type of document, by populating fields that correlate with said event, said inferred event, said agency information, and personal information associated with said user.

2. The method of claim 1 also comprising electronically filing said document with the appropriate agency based on said inferred event.

3. The method of claim 1 also wherein said authenticating the identity of a user is via secured third party providers.

4. A system for intelligently and automatically generating appropriate formatted event documents comprising:
   a computer system including a computer server and at least one computer terminal, said at least one computer terminal being connectable for remote communication through the internet with said computer server; and
   said computer system being programmed to perform a method for intelligently and automatically generating appropriate formatted event documents, said method including the steps of:

authenticating the identity of a user;

determining agency information available;

collecting said agency information;

matching an event associated with said user;

determining an inferred event based at least in part on said event using an algorithm associated with said event, wherein said inferred event is directly related to said event;

correlating and relating said inferred event with said event by examining said agency information;

determining the type of document to create based on said inferred event;

controlling said computer terminal to allow the user to review and reconfigure said event, said agency information, said inferred event, and said document by choosing selections from a group of selections displayed by said computer terminal;

generating a document, based on said determined type of document, by populating fields that correlate with said event, said inferred event, said agency information, and personal information associated with said user;

filing said document with the appropriate agency based on said inferred event;

generating a report reflecting the success or failure of the document generation and filing.

5. A system for intelligently and automatically generating appropriate formatted legal documents related to expunction comprising:

a) a computer system including at least one computer terminal and a display device;

b) one or more input devices;

c) a third party service provider database in network communication with said computer system, wherein said third party service provider database receives login information input by a user of said computer system, via said one or more input devices, and wherein said third party service provider database communications personal information relating to said user back to said computer system for authenticating said user;

d) one or more event information databases in network communication with said computer system, said one or more event information databases being configured for storing event records and/or event information associated with said user, wherein said event records and/or event information includes relevant date information related to an event, arrest records, case status, charge type, misdemeanor class or felony degree, related charges, case disposition records, and appeal status;

e) one or more agency information databased in network communication with said computer system, said one or more agency information databases being configured for storing event-related agency information related to at least some of said event records and/or said event information associated with said user, wherein said event-related agency information includes criminal code status, codified rules of criminal procedure, internal agency policies, costs of filing documents, and agency contact information;

f) an acquisition system being operable to query said third party service provider database, said one or more event information databases, and said one or more agency information databases, whereby in response to said query, said acquisition system acquires data associated with said user, via a secure network connection, from said one or more third party service provider databases, said one or more event information databases, and said one or more agency information databases;

g) a system database configured for storing said personal information and said event information associated with said user;

h) one or more forms databases configured for storing categories of legal forms including appropriate forms related to expunction;

i) said acquisition system being configured to employ a script to reformat said event information acquired by said acquisition system into a format usable by said system database;

j) said system database comprising a data table having a plurality of data fields;

k) said acquisition system being further configured to populate said data fields with said reformatted event information;

l) said computer system being programmed to correlate said event-related agency information with said reformatted event information from said data table through use of a conversion table that instructs said computer system to assign values to variables based on said event information associated with said user;

m) said computer system being further programmed to determine, based at least in part on said correlation, whether said event information associated with said user meets statutory requirements for expunction;

n) upon determination that said event information associated with said user meets statutory requirements for expunction, said computer system being further programmed to search said one or more forms databases for an appropriate document template, said computer system being further programmed to automatically generate one or more appropriate formatted expunction documents by populating fields on said document template with said personal information, said event-related agency information, and said event information associated with said user, wherein said one or more appropriate formatted expunction documents includes a petition for expunction.

* * * * *